United States Patent
Fujita et al.

(10) Patent No.: US 10,968,974 B2
(45) Date of Patent: Apr. 6, 2021

(54) DAMPER

(71) Applicant: DELTA TOOLING CO., LTD., Hiroshima (JP)

(72) Inventors: Etsunori Fujita, Higashihiroshima (JP); Yumi Ogura, Higashihiroshima (JP); Ryuji Kuwano, Hiroshima (JP); Jiro Kondo, Aki-gun (JP); Jun Fukuda, Aki-gun (JP)

(73) Assignee: DELTA TOOLING CO., LTD., Hiroshima (JP)

(*) Notice: Subject to any disclaimer, the term of this patent is extended or adjusted under 35 U.S.C. 154(b) by 100 days.

(21) Appl. No.: 16/322,662

(22) PCT Filed: Aug. 4, 2017

(86) PCT No.: PCT/JP2017/028405
§ 371 (c)(1),
(2) Date: Feb. 1, 2019

(87) PCT Pub. No.: WO2018/025992
PCT Pub. Date: Feb. 8, 2018

(65) Prior Publication Data
US 2020/0271181 A1 Aug. 27, 2020

(30) Foreign Application Priority Data
Aug. 4, 2016 (JP) ................................ 2016-153526

(51) Int. Cl.
*F16F 7/09* (2006.01)
*F16F 9/19* (2006.01)
(Continued)

(52) U.S. Cl.
CPC .................. *F16F 7/09* (2013.01); *F16F 9/19* (2013.01); *F16F 9/512* (2013.01); *B60N 2/50* (2013.01)

(58) Field of Classification Search
CPC .................. F16F 3/06; F16F 7/09; F16F 9/19
(Continued)

(56) References Cited

U.S. PATENT DOCUMENTS 2,212,759 A * 8/1940 Tea ........................... F16F 7/09
267/200
2,313,486 A * 3/1943 Gratzmuller ............. F16J 15/50
92/99
(Continued)

FOREIGN PATENT DOCUMENTS

EP 0682190 A2 11/1995
JP 57-128816 2/1984
(Continued)

OTHER PUBLICATIONS

International Search Report dated Oct. 17, 2017, in PCT/JP2017/028405, filed Aug. 4, 2017.
(Continued)

*Primary Examiner* — Christopher P Schwartz
(74) *Attorney, Agent, or Firm* — Oblon, McClelland, Maier & Neustadt, L.L.P.

(57) ABSTRACT

A damper includes: a line-shaped member wound around an outer peripheral surface of a piston which makes a relative motion in a cylinder; and a viscous fluid made to adhere to the line-shaped member and exhibiting viscous damping force. The relative motion of the cylinder and the piston produces tension, and in the line-shaped member, as an amplitude is smaller, its contiguously wound portions each try to deform to twist along a circumferential direction of the line-shaped member itself, and as the amplitude is larger, the contiguously wound portions try to deform as a unit. When the amplitude is small, frictional resistance decreases, resulting in smooth motion of the piston, and appropriate damping force is obtained due to the viscous damping force of the viscous fluid. When the amplitude is large, as a result of the
(Continued)

increased tendency that the contiguously wound portions of the line-shaped member try to deform as a unit, friction damping force acts relatively greatly.

9 Claims, 25 Drawing Sheets

(51) Int. Cl.
     *F16F 9/512*      (2006.01)
     *B60N 2/50*      (2006.01)

(58) Field of Classification Search
     USPC .................. 267/33, 35, 195–215, 257, 258
     See application file for complete search history.

(56) References Cited

U.S. PATENT DOCUMENTS

| | | | | |
|---|---|---|---|---|
| 2,373,508 A | * | 4/1945 | Snyder | B60G 13/04 267/200 |
| 2,459,537 A | * | 1/1949 | Oberstadt | F16F 7/09 188/129 |
| 2,562,595 A | * | 7/1951 | Blue | B60G 13/04 267/134 |
| 2,948,529 A | * | 8/1960 | Maier | F16F 3/06 267/204 |
| 3,039,757 A | * | 6/1962 | Barr | F16F 1/40 267/140 |
| 5,345,860 A | | 9/1994 | Bowell | |
| 5,435,233 A | | 7/1995 | Bowell, Sr. | |
| 5,588,350 A | | 12/1996 | Bowell, Sr. | |
| 2006/0219505 A1 | | 10/2006 | Zdeb | |

FOREIGN PATENT DOCUMENTS

| | | |
|---|---|---|
| JP | 59-32742 U | 2/1984 |
| JP | 8-49766 A | 2/1996 |
| JP | 2015-78725 A | 4/2015 |
| JP | 2015-117754 A | 6/2015 |

OTHER PUBLICATIONS

Extended European Search Report dated Oct. 24. 2019 in European Patent Application No. 17837093.8, 5 pages.

\* cited by examiner

FIG. 4
(a)
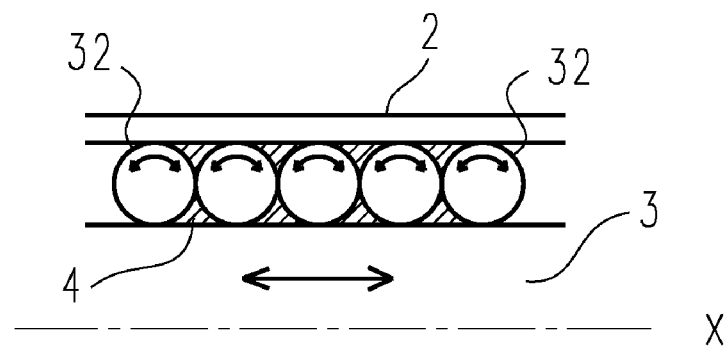
(b)
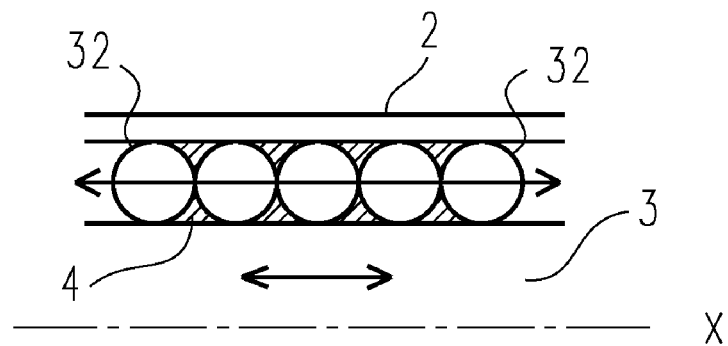

DAMPER

TECHNICAL FIELD

The present invention relates to a damper.

BACKGROUND ART

Various dampers (shock absorbers) for absorbing vibration during traveling are disposed in seat suspensions for supporting seats of automobiles, suspensions disposed between wheels and a vehicle body, and so on. Further, various dampers are used not only in vehicles such as automobiles but also in various industrial apparatuses, robot joint parts, and opening/closing parts and hinge parts of doors, laptop personal computers, and so on for the purpose of vibration absorption, shock buffering, and so on. As these dampers, there are known a damper which has a viscous fluid filled in a cylinder and uses viscous drag produced when a piston slides in the cylinder (a viscous damper or an oil damper) as in Patent Document 1, and a friction damper which uses friction force between a piston and a cylinder as in Patent Document 2.

PRIOR ART DOCUMENT

Patent Document

Patent Document 1: Japanese Patent Application Laid-open No. 2015-78725
Patent Document 1: Japanese Patent Application Laid-open No. 2015-117754

SUMMARY OF THE INVENTION

Problems to be Solved by the Invention

Using the viscous drag of the viscous fluid as in Patent Document 1 may not produce sufficient damping force when the stroke is small and the speed is low. Further, when the input has a small stroke, the friction damper of Patent Document 2 may become a rigid body without functioning as a damper, due to large friction damping force.

The present invention was made in consideration of the above, and has an object to provide a damper having a simple structure yet capable of exhibiting appropriate damping force both when a displacement amount is small and when the displacement amount is larger, and further has an object to provide a damper capable of exhibiting damping force according to vibration frequencies, that is, around a frequency at which the resonance (main resonance) of a control target structure occurs and around a frequency at which secondary resonance occurs, to thereby achieve the effective damping of the vibration of the control target structure.

Means for Solving the Problems

In order to solve the aforesaid problems, the damper of the present invention is a damper which includes a casing and a movable body which makes a relative motion in the casing, the damper including:
a line-shaped member which is wound around an outer peripheral surface of the movable body and exhibits friction damping force against the casing during the relative motion; and
a viscous damping element which exhibits viscous damping force due to the relative motion of the casing and the movable body,
wherein the line-shaped member changes in tension according to the relative motion and has a function of changing the friction damping force between the line-shaped member and the casing and the viscous damping force of the viscous damping element to change total damping force which is a sum of the friction damping force and the viscous damping force, according to an amplitude and a speed during the relative motion.

Preferably, when the amplitude and the speed during the relative motion of the casing and the movable body are in predetermined ranges or less, the total damping force is substantially equal to or less than damping force of a friction damper having the same structure except that the friction damper does not have the viscous damping element.

Preferably, the line-shaped member is densely wound around the outer peripheral surface of the movable body.

Preferably, the line-shaped member is wound around the outer peripheral surface of the movable body, being inclined by 30 degrees or more with respect to a direction of the relative motion.

Preferably, the line-shaped member has a nap-raised surface or a surface on which short fibers are planted.

Preferably, the viscous damping element is a viscous fluid adhering to the line-shaped member.

Preferably, the viscous fluid is grease.

As another possible structure, the casing and the movable body are constituted using a permanent magnet and a conductor, and a magnetic field formed by the permanent magnet and the conductor constitutes the viscous damping element.

Further, the present invention is applicable to a telescopic damper in which the casing is a cylinder and the movable body is a piston which is displaced in an axial direction in the cylinder. In this case, in the damper of the present invention, the cylinder and the piston can be disposed in a substantially horizontal posture between two members which are displaced relative to each other. Further, the present invention is applicable to a rotary damper in which the movable body is a rotor rotatably disposed in the casing.

Effect of the Invention

The present invention includes: the line-shaped member wound around the outer peripheral surface of the movable body; and the viscous damping element which exhibits the viscous damping force during the relative motion of the casing and the movable body. When the line-shaped member starts to move in some direction in accordance with the relative motion of the casing and the movable body, the line-shaped member itself rotates and at the same time, deforms due to the tension generated therein, and consequently, the line-shaped member which is an elasto-plastic body comes to have restoring force (elastic force) without plastically deforming. In particular, as the amplitude is smaller, contiguously wound portions of the wound line-shaped member each rotate along the circumferential direction of the line-shaped member itself to be twisted. On the other hand, as the amplitude becomes large, the contiguously wound portions more tend to undergo slip deformation as a unit, resulting in the generation of friction force. As a result, unlike the friction damper of Patent Document 2, when the amplitude is small, frictional resistance reduces, the movable body makes the motion accompanied by elastic force, and due to the viscous damping force generated by the viscous damping element (viscous fluid) adhering to the line-shaped member, damping force appropriate for a small displacement amount is obtained as a whole. When the amplitude is large, because of the aforesaid increased tendency that the contiguously wound portions of the line-shaped member try to deform as a unit, the friction damping force is combined with the elastic force and the viscous damping force, resulting in high total damping force. That is, in the damper of the present invention, the line-shaped member has a function of changing the damping force by torsional deformation and an elastic function by the torsional deformation and the tension, so that, in either of the cases where the displacement amount is small and the displacement amount is larger, the whole system can exhibit appropriate damping force according to each case.

Further, by using the permanent magnet and the conductor as the casing and the movable body, it is also possible to constitute the viscous damping element by the magnetic field formed by the permanent magnet and the conductor. In this case as well, the same operation and effect as those when the viscous fluid is used are exhibited, and depending on the magnetic force adjustment by the selection of the permanent magnet, depending on the presence/absence of a yoke, or the like, it is possible to variously adjust the speed-dependent viscous damping force, leading to a wider application range of the damper.

BRIEF DESCRIPTION OF DRAWINGS

FIGS. 4(a), (b) are explanatory views of the operations of the damper according to the embodiment.

MODES FOR CARRYING OUT THE INVENTION

Figure 1:
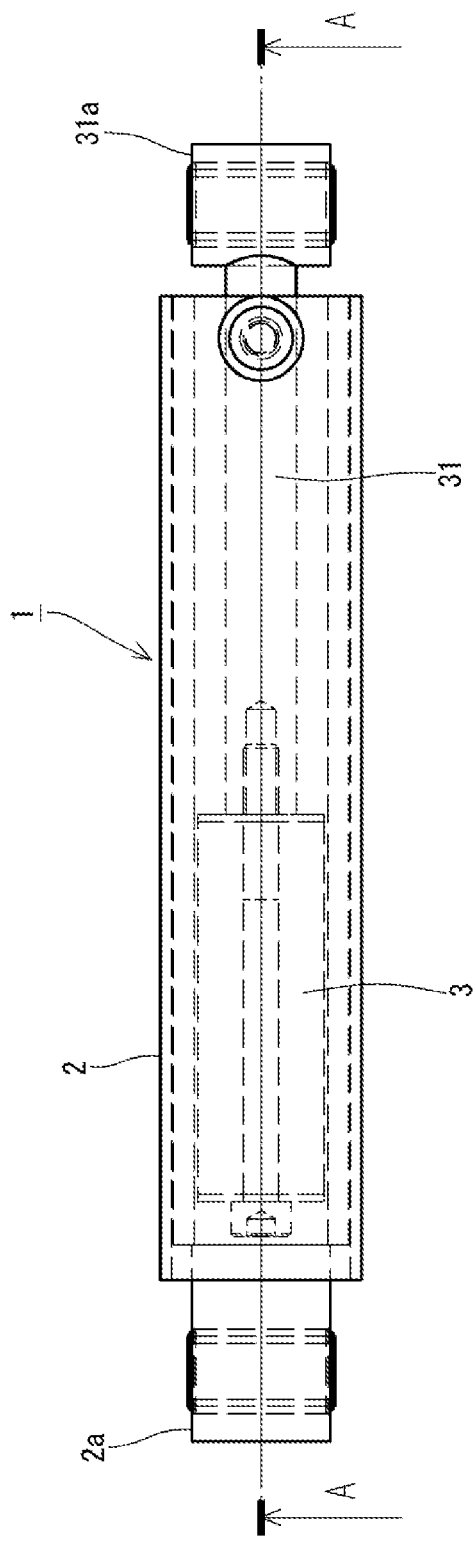
FIG. 1 is a plane view illustrating a damper according to one embodiment of the present invention.
Figure 2:
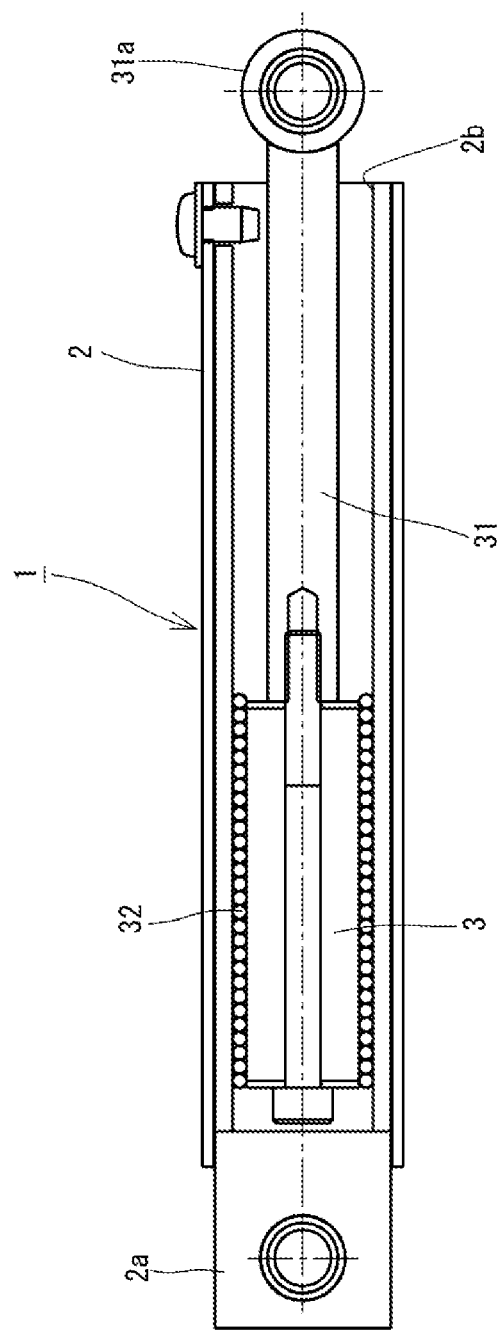
FIG. 2 is a sectional view taken along A-A line in FIG. 1.

The present invention will be hereinafter described in more detail based on the embodiment illustrated in the drawings. FIG. 1 and FIG. 2 are views illustrating a damper 1 of this embodiment. The damper 1 of this embodiment is a telescopic damper including a cylinder 2 corresponding to the casing and a piston 3 corresponding to the movable body.

The cylinder 2 is a cylindrical body and has, at its closed end portion, a coupling part 2a coupled to some position of a control target apparatus. The piston 3 is inserted into the cylinder 2 from an open end 2b of the cylinder 2. A piston rod 31 is coupled to the piston 3, and an end portion 31a of the piston rod 31 protrudes to the outside from the open end 2b of the cylinder 2 and is coupled to a position of the control target apparatus, corresponding to the position to which the coupling part 2a of the cylinder 2 is coupled.

Figure 3:
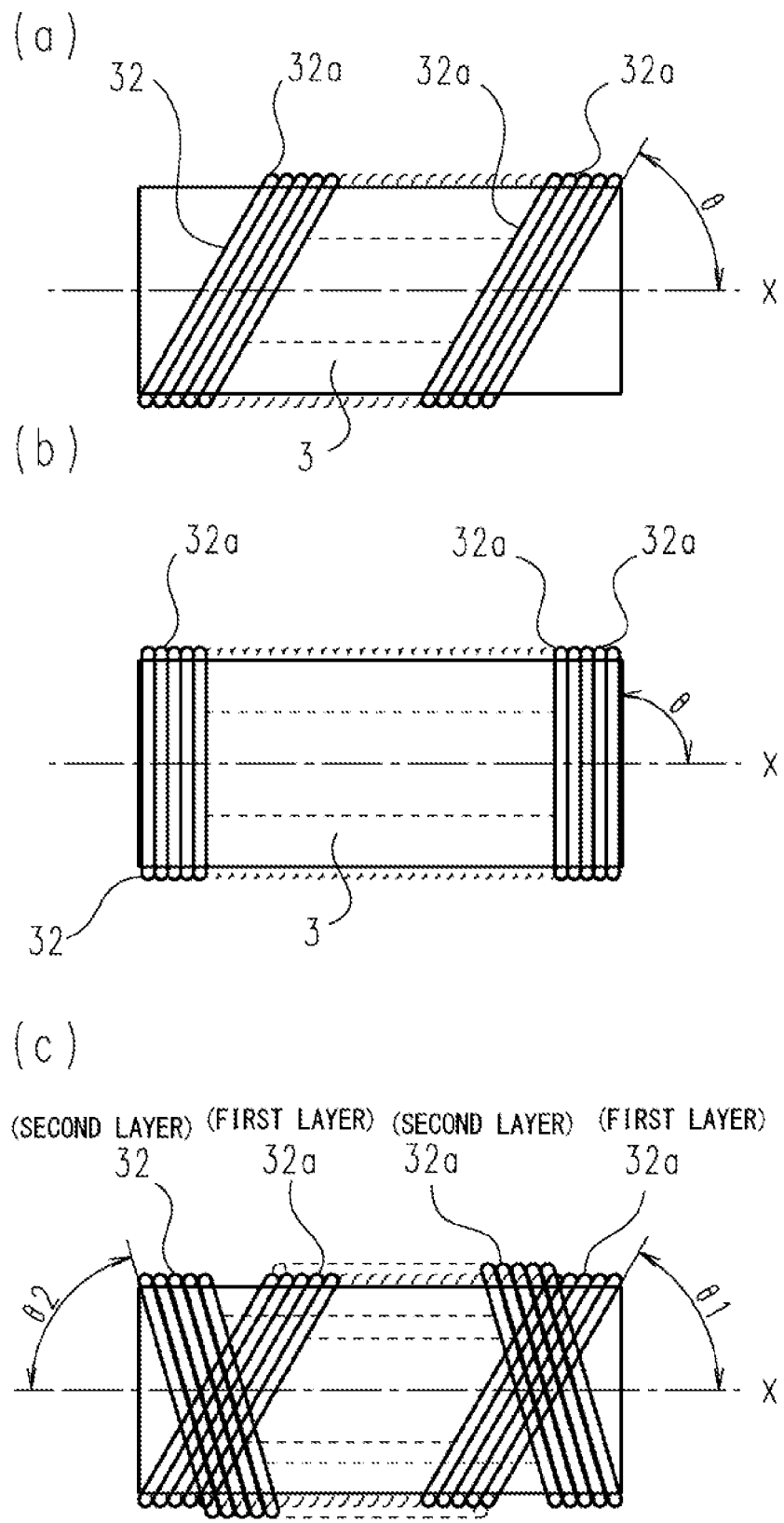
FIGS. 3(a) to (c) are views illustrating examples of how a line-shaped member is wound in the damper according to the embodiment.
Figure 5:
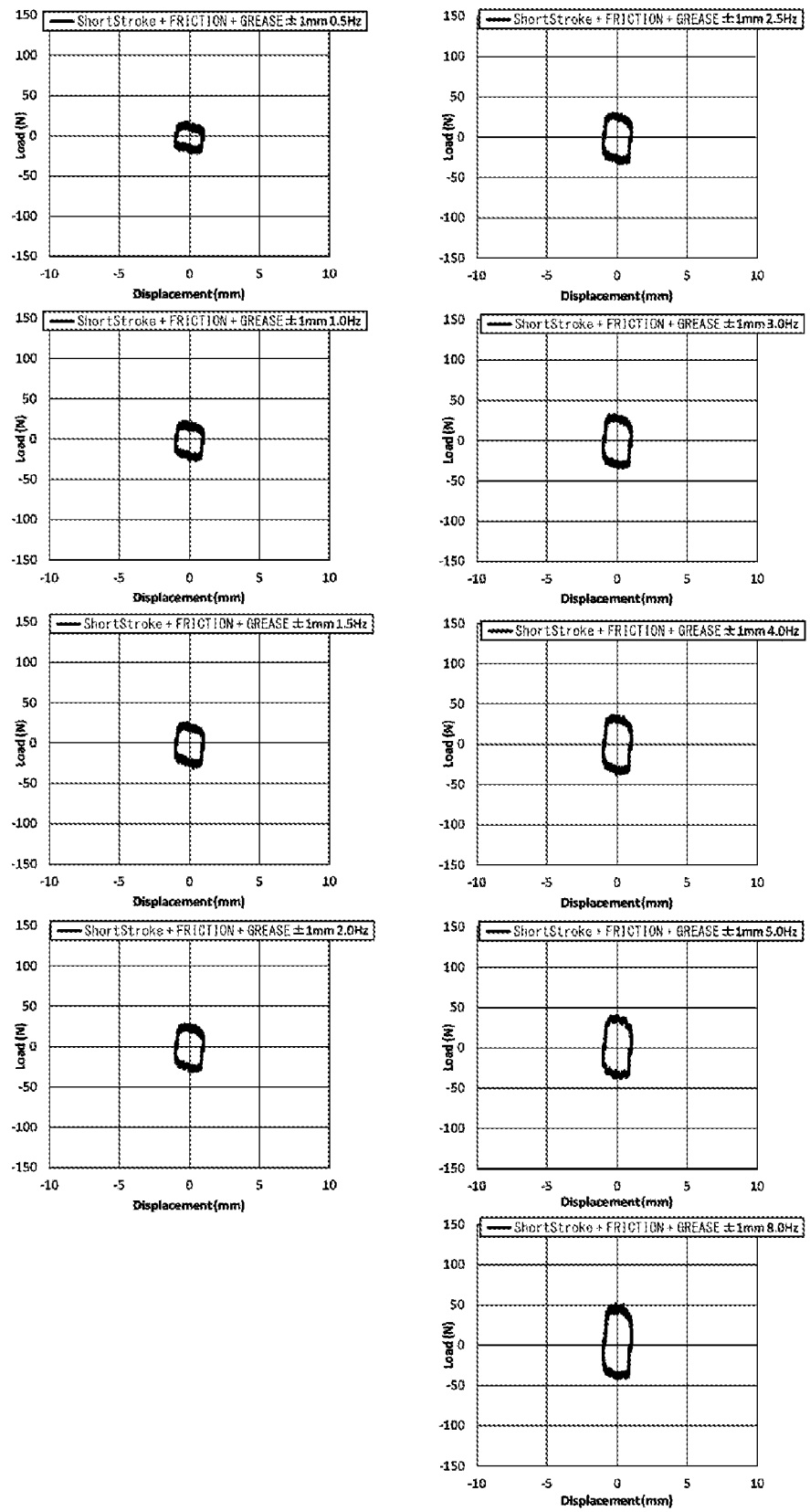
FIG. 5 illustrates charts of damping characteristics of the damper according to the embodiment under varied frequencies when vibration with a ±1 mm amplitude is given.
Figure 6:
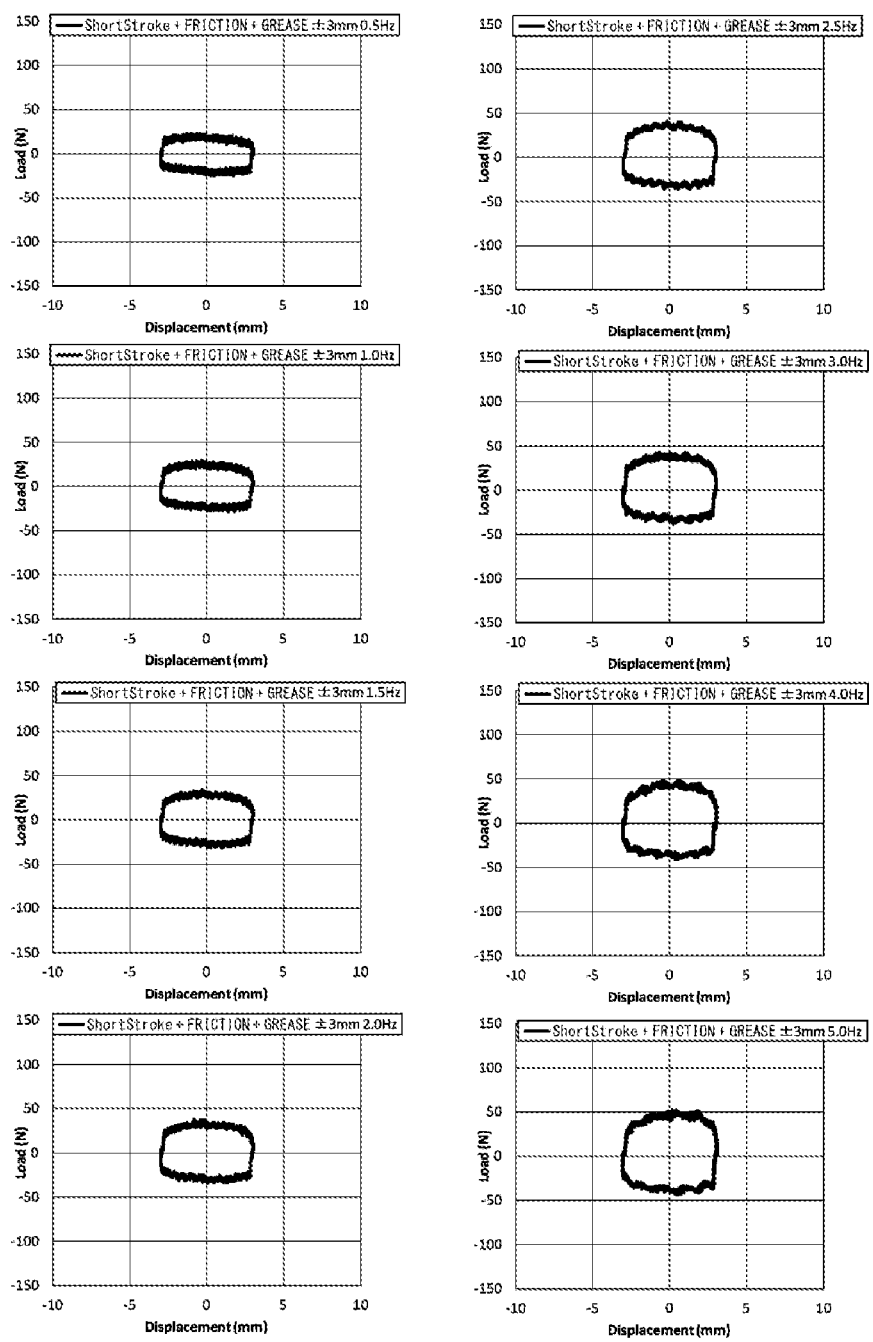
FIG. 6 illustrates charts of damping characteristics of the damper according to the embodiment under varied frequencies when vibration with a ±3 mm amplitude is given.
Figure 7:
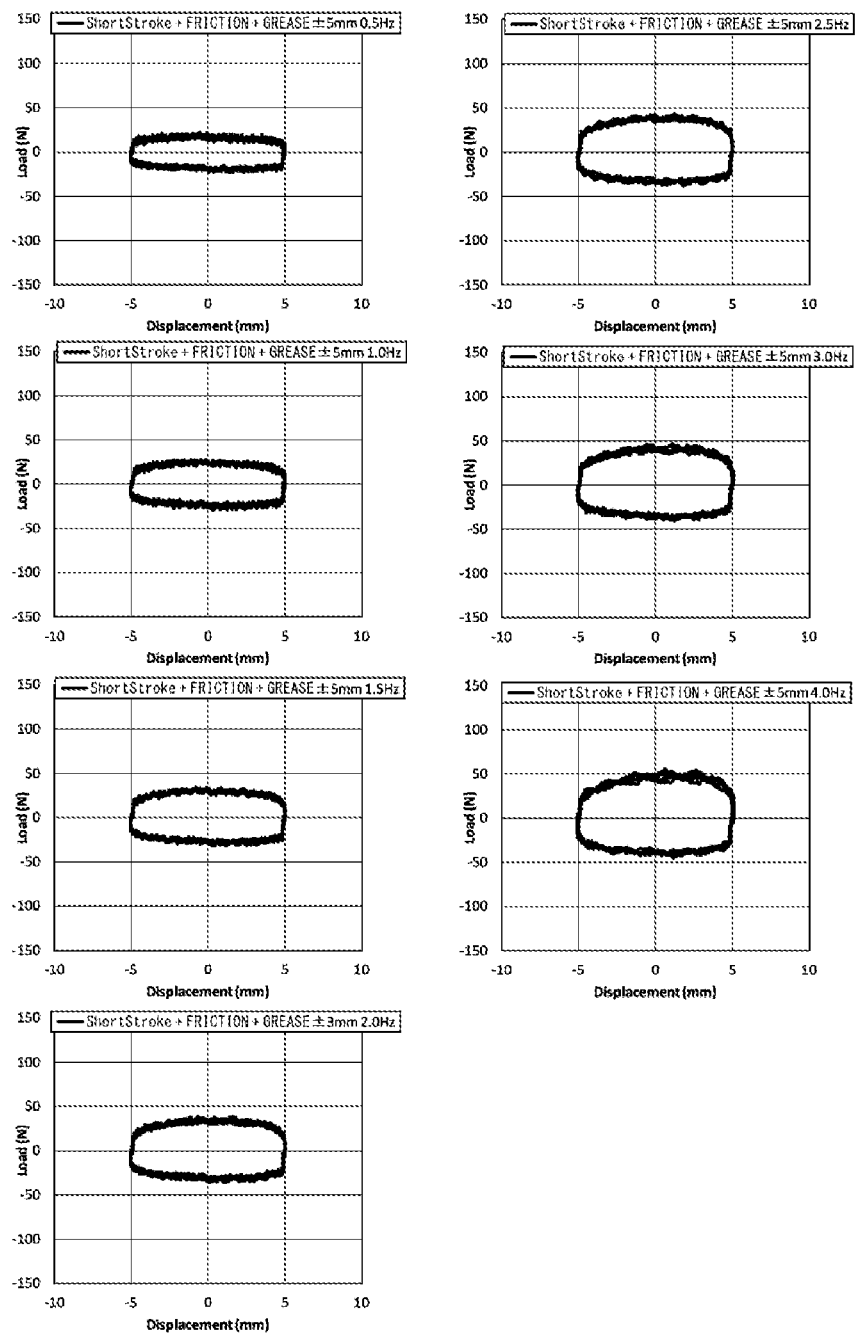
FIG. 7 illustrates charts of damping characteristics of the damper according to the embodiment under varied frequencies when vibration with a ±5 mm amplitude is given.
Figure 8:
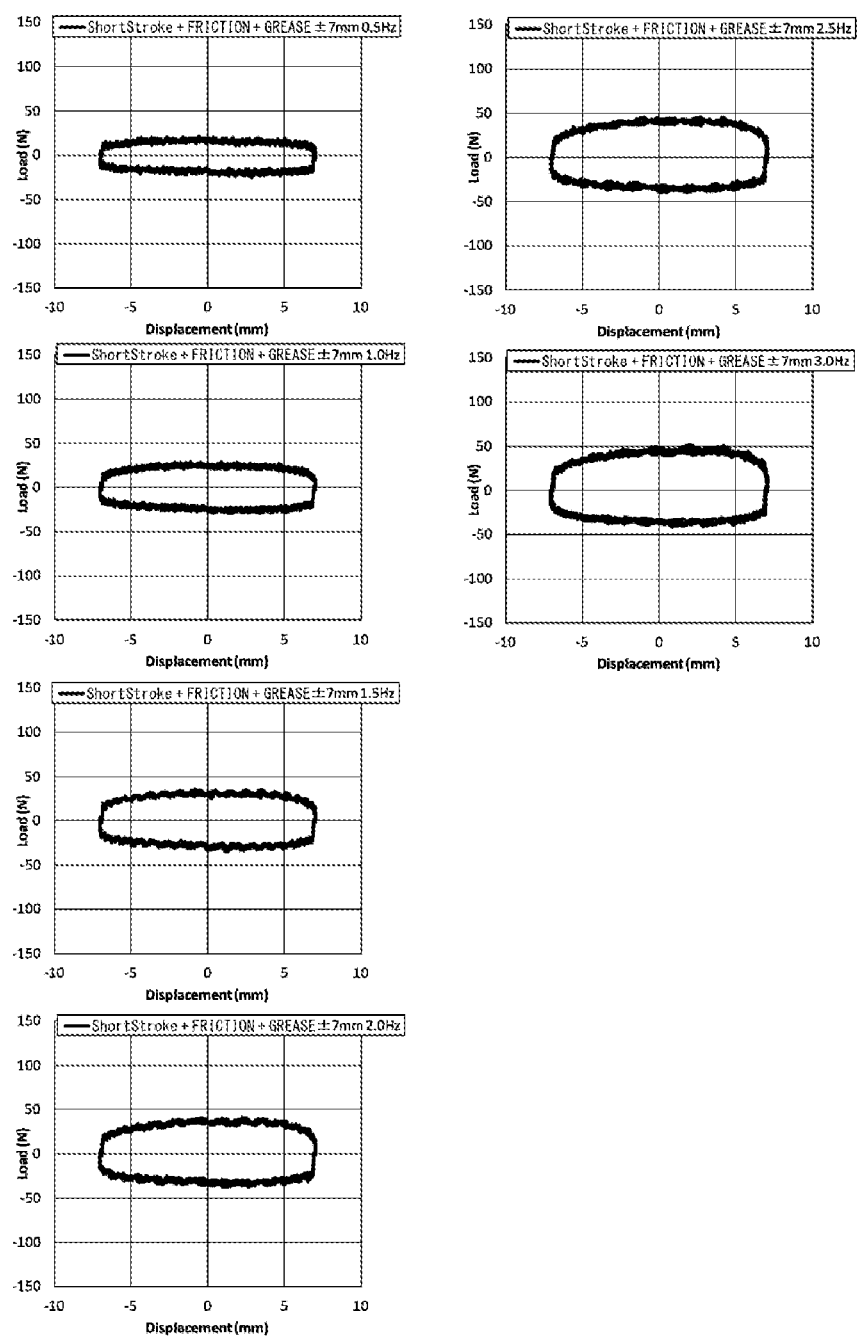
FIG. 8 illustrates charts of damping characteristics of the damper according to the embodiment under varied frequencies when vibration with a ±7 mm amplitude is given.

A line-shaped member 32 is wound around an outer peripheral surface of the piston 3. As illustrated in FIG. 2, the line-shaped member 32 is preferably wound densely around the outer peripheral surface of the piston 3 with almost no gap in an axial direction. More preferably, the line-shaped member 32 is wound, being inclined by a predetermined angle with respect to a relative motion direction of the piston 3 (refer to FIGS. 3(a), (b)). In the case where it is wound in this manner, the inclination angle θ is preferably 30 degrees or more in terms of an acute-side angle made by an axis x in the relative motion direction of the piston 3 and each of portions (wound portions) 32a of the line-shaped member 32 which are contiguously wound around the outer peripheral surface of the piston 3 (FIG. 3(a) is an example where θ=about 60 degrees, and FIG. 3(b) is an example where θ=about 90 degrees). This makes it easier for force generated at the time of the relative motion of the piston 3 to act on the wound portions 32a in a diameter direction to make it easy for the wound portions 32a forming the line-shaped member 32 to deform.

The line-shaped member 32 is constituted by a thread or a string in this embodiment. Its material is not limited, and it is formed of a synthetic fiber, a natural fiber, or the like. Further, as the thread, either of a monofilament and a multifilament is usable, but the thread is preferably a multifilament formed of a fiber bundle because a later-described viscous fluid 4 being the viscous damping element easily adheres to such a multifilament, the multifilament can be in contact with an inner peripheral surface of the cylinder 2 at multiple points, and the multifilament can be expected to produce high friction damping force. Incidentally, in either case, preferably, short fibers are planted on a surface of the thread or the string constituting the line-shaped member 32, or the surface of the thread or the string constituting the line-shaped member 32 is nap-raised. Such planting of the short fibers or nap-raising of the surface facilitates the adhering of the viscous fluid 4.

The diameter (outside diameter) of the thread or the string constituting the line-shaped member 32 is not limited, either, but is selected so as make it possible for predetermined friction force to be exhibited against the inner peripheral surface of the cylinder 2 during the relative motion of the cylinder 2 and the piston 3 around whose outer peripheral surface the line-shaped member 32 is wound. Further, depending on the diameter, the line-shaped member 32 can also be wound around the outer peripheral surface of the piston 3 in a plurality of layers, for example, in two layers or three layers. In the case of the winding in the plurality of layers, it can also be wound such that the first layer and the second layer cross each other as illustrated in FIG. 3(c), for instance (FIG. 3(c) is an example where they cross each other, with θ1 and θ2 both being about 70 degrees) as well as being wound while inclined by the predetermined angle with respect to the relative motion direction of the piston 3 as described above. Note that the material, the diameter, or the number of turns of the thread or the string constituting the line-shaped member 32, and further the material and the length or diameter of the short fibers planted on the line-shaped member 32, a raising degree, the tension of the line-shaped member 32, and so on are appropriately set in consideration of the damping force required of the damper 1, the materials or the sizes of the cylinder 2 and the piston 3, and so on.

The line-shaped member 32 has the viscous fluid 4 as the viscous damping element adhering thereto (refer to FIGS. 4(a), (b)). The kind of the viscous fluid 4 is not limited, and one having a predetermined property can be selected according to the damping force required of the damper 1. However, since it is made to adhere to the line-shaped member 32, one having lower fluidity than that of oil, for example, grease is preferably used. In particular, its penetration of JIS K 2220 at 25° C. falls within a range of, preferably, 175 to 340, more preferably, 220 to 250. Examples of a usable adhering method include a method in which it impregnates the line-shaped member 32 so as to be held between the fibers forming the thread or the string, and a method in which it is applied using a brush or a spatula so as to be held between the short fibers provided by a planting means or a raising means.

The damper 1 of this embodiment has the line-shaped member 32 wound around the outer peripheral surface of the piston 3. Accordingly, with the movement of the piston 3, torsional deformation and tension occur in the line-shaped member 32. Specifically, when the piston 3 makes the relative displacement in the cylinder 2, the line-shaped member 32 provided around the outer peripheral surface of the piston 3 moves while sliding in contact on the inner peripheral surface of the cylinder 2, and accordingly is pulled along the axial direction (the moving direction of the piston 3) to have tension, and when the input has a small amplitude and a low speed, the friction force becomes dominant and the line-shaped member 32 torsionally deforms. Consequently, in the line-shaped member 32, the wound portions 32a wound around the piston 3 are given force in the axial direction and the rotation direction and each deform so as to be substantially flat. Accordingly, the friction force against the inner peripheral surface of the cylinder 2 reduces but restoring force (elastic force) is generated due to an increase in the tension accompanied by the deformation of the line-shaped member 32. Further, the reduction in the friction force leads to a relative increase of the action of the viscous damping force of the viscous fluid 4.

Specifically, when the displacement amount of the piston 3 is relatively small, that is, when the amplitude is small, in accordance with the displacement of the piston 3, the contiguously wound portions 32a of the line-shaped member 32 are each twisted so as to rotate along the circumferential direction of the wound portions 32 themselves as illustrated in FIG. 4(a), and in addition, each slightly deform into a substantially flat shape, so that the tension increases. Consequently, as for the friction force of the line-shaped member 32 against the inner peripheral surface of the cylinder 2, when the piston 3 starts to move, in accordance with a decrease in a friction coefficient by the viscous fluid 4 adhering to the line-shaped member 32, the piston 3 starts to move speedily. At the same time, the viscous damping force of the viscous fluid 4 acts between the inner peripheral surface of the cylinder 2 and the line-shaped member 32, and accordingly, speed-dependent damping force, namely, the viscous damping force and the elastic force due to the torsional deformation and the tension of the line-shaped member 32, mainly acts on the piston 3. Of course, certain friction damping force also acts on the line-shaped member 32, though reduced by the aforesaid deformation.

Each of the wound portions 32a of the line-shaped member 32 tries to rotate by being twisted like a torsion bar as in FIG. 4(a) while the displacement amount of the piston 3 is small, but when the displacement amount of the piston 3 is relatively large, that is, when the amplitude is large, the wound portions 32a deform as a unit so as to be pushed in the same direction as illustrated in FIG. 4(b) as the piston 3 is further greatly displaced in one direction or the opposite direction. This makes the contact area of the line-shaped member 32 and the inner peripheral surface of the cylinder 2 larger than when the amplitude is small, resulting in an increase in the total friction force. Therefore, when the amplitude is large, the elastic force by torsional stress also acts and the friction damping force more greatly acts than when the amplitude is small. Of course, the viscous damping force of the viscous fluid held on the line-shaped member 32 acts together, so that high total damping force is exhibited.

For example, as a damping system having a speed-dependent damping characteristic and a displacement-dependent damping characteristic, there has been conventionally known a composite damping system in which a plurality of sets of a piston and a cylinder are prepared, any of the sets is structured to have the speed-dependent characteristic, the other set is structured to have the displacement-dependent characteristic, and they all are considered as one system. However, such a damping system has a complicated structure and necessarily becomes a large one for the application to a building quakeproof system, and is not suitable as a small damper.

On the other hand, in the damper 1 of the present invention, since the line-shaped member 32 is wound around the piston 3 and the viscous fluid 4 is made to adhere to the line-shaped member 32, the elastic force and the tension by the torsional stress change in the line-shaped member 4 according to the relative motion, and the small friction coefficient of the adhering viscous fluid 4 is combined to change the friction damping force, so that the speed-dependent viscous damping force and the displacement-dependent elastic force each change as described above, and owing to the combination of these, the damper 1 of the present invention has the function of changing the total damping force according to each dependency. Therefore, even though having only one set of the cylinder 2 and the piston 3, the damper 1 has both the displacement- and speed-dependent damping characteristics, that is, in the case of the small amplitude, appropriate damping force can be exhibited owing to the speed-dependent damping characteristic when the speed is low and in addition, as the amplitude becomes larger, the friction force is added to increase the total damping force. Therefore, the damper 1 of the present invention is suitable for downsizing even though having the composite damping characteristics.

Experimental Example 1

The damper 1 was set on a servo pulser (Shimadzu Corporation), and the piston 3 was displaced relative to the cylinder 2. The vibration frequency was varied from 0.5 Hz to 8.0 Hz in 0.5 Hz increments, and the amplitude was set to ±1 mm, ±3 mm, ±5 mm, and ±7 5 mm. As the line-shaped member 32 of the damper 1, one in which short fibers made of polyamide (PA6.6) and having a 0.9 dtex diameter and a 0.5 mm length were planted on a surface of a multifilament thread made of polyamide (PA6) and having a 470 dtex diameter was wound densely around the outer peripheral surface of the piston 3 in a single layer, with the angle θ shown in FIGS. 3(a), (b) being about 85 degrees, and on this line-shaped member 32, grease as the viscous fluid 4, specifically, trade name: Valiant Grease R2 (Showa Shell Sekiyu K.K., a thickener: lithium soap, base oil: synthetic oil (dynamic viscosity (100° C.) of JIS K2283: 19.3, penetration of JIS K 2220 236 (unworked) and worked (274)) was made to adhere using a spatula.

FIG. 5 to FIG. 8 are Lissajous figures representing relations between a displacement amount (horizontal axis) and damping force (vertical axis) in experimental results of the damper 1 of this embodiment, and FIG. 9 to FIG. 12 are Lissajous figures representing relations between a displacement amount (horizontal axis) and damping force (vertical axis) in experimental results of a damper (comparative example: friction damper) having the same structure as that of this embodiment except that its line-shaped member 32 is not impregnated with the viscous fluid 4 of this embodiment.

Figure 9:
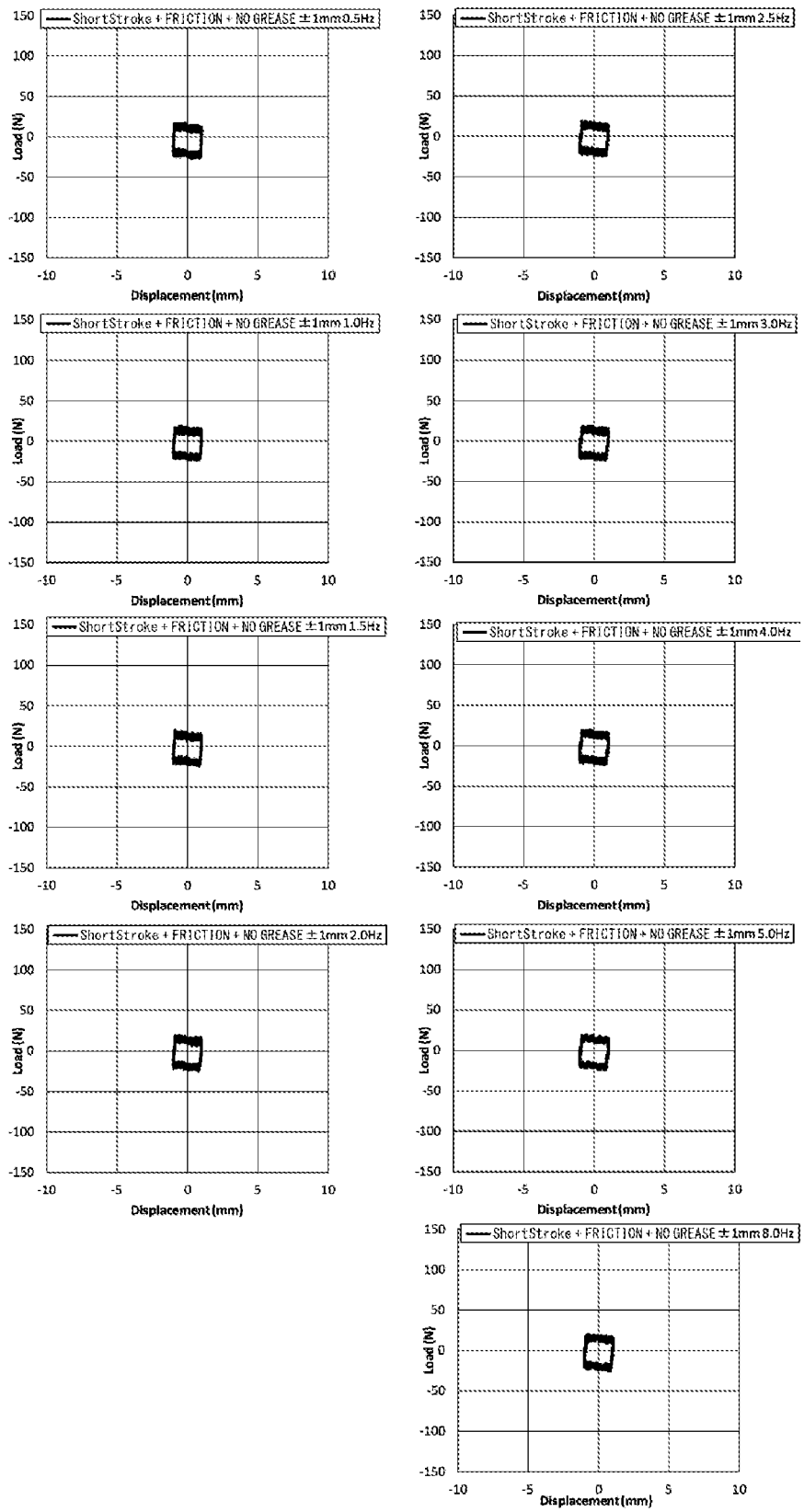
FIG. 9 illustrates charts of damping characteristics of a damper according to a comparative example under varied frequencies when vibration with a ±1 mm amplitude is given.
Figure 10:
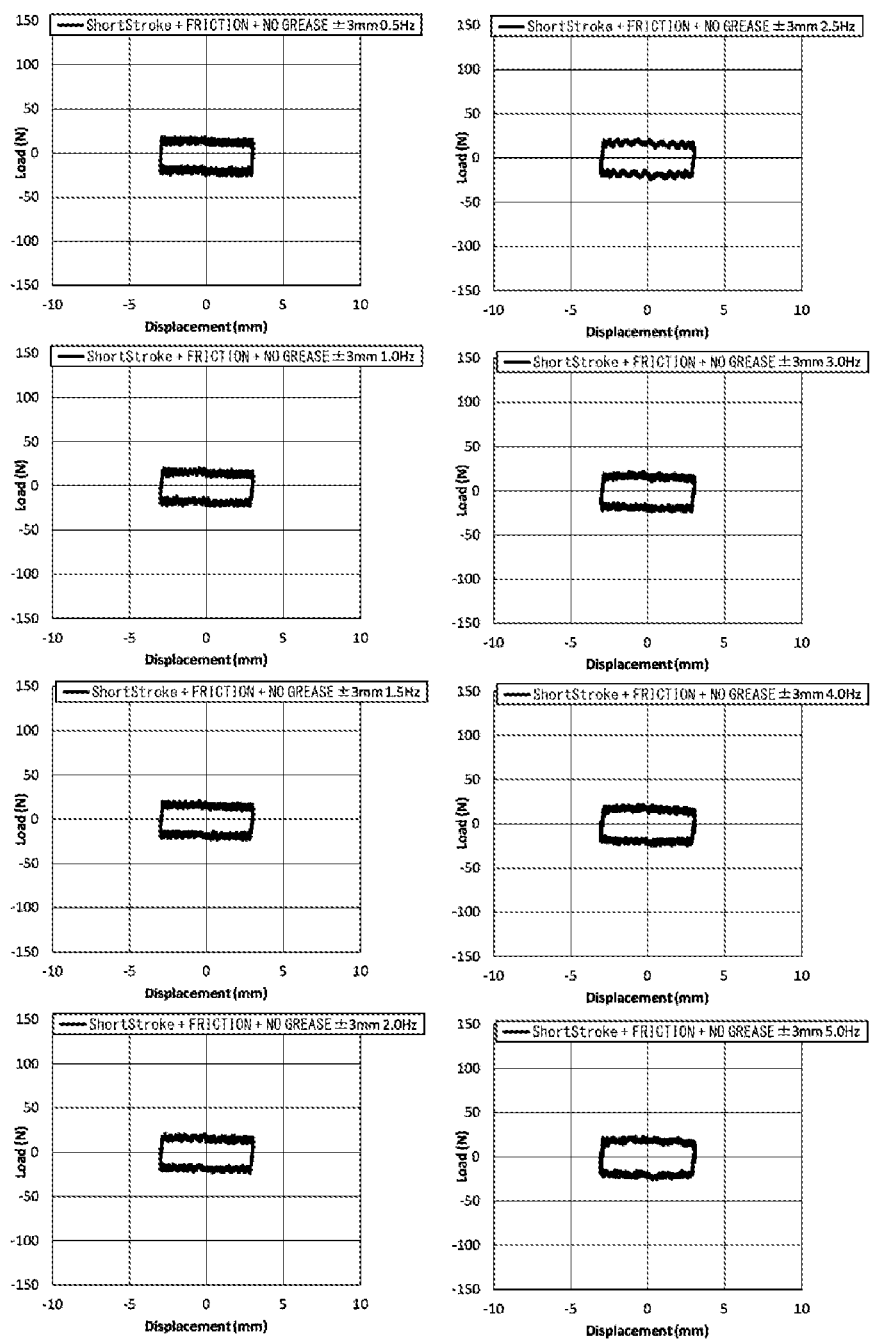
FIG. 10 illustrates charts of damping characteristics of the damper according to the comparative example under varied frequencies when vibration with a ±3 mm amplitude is given.
Figure 11:
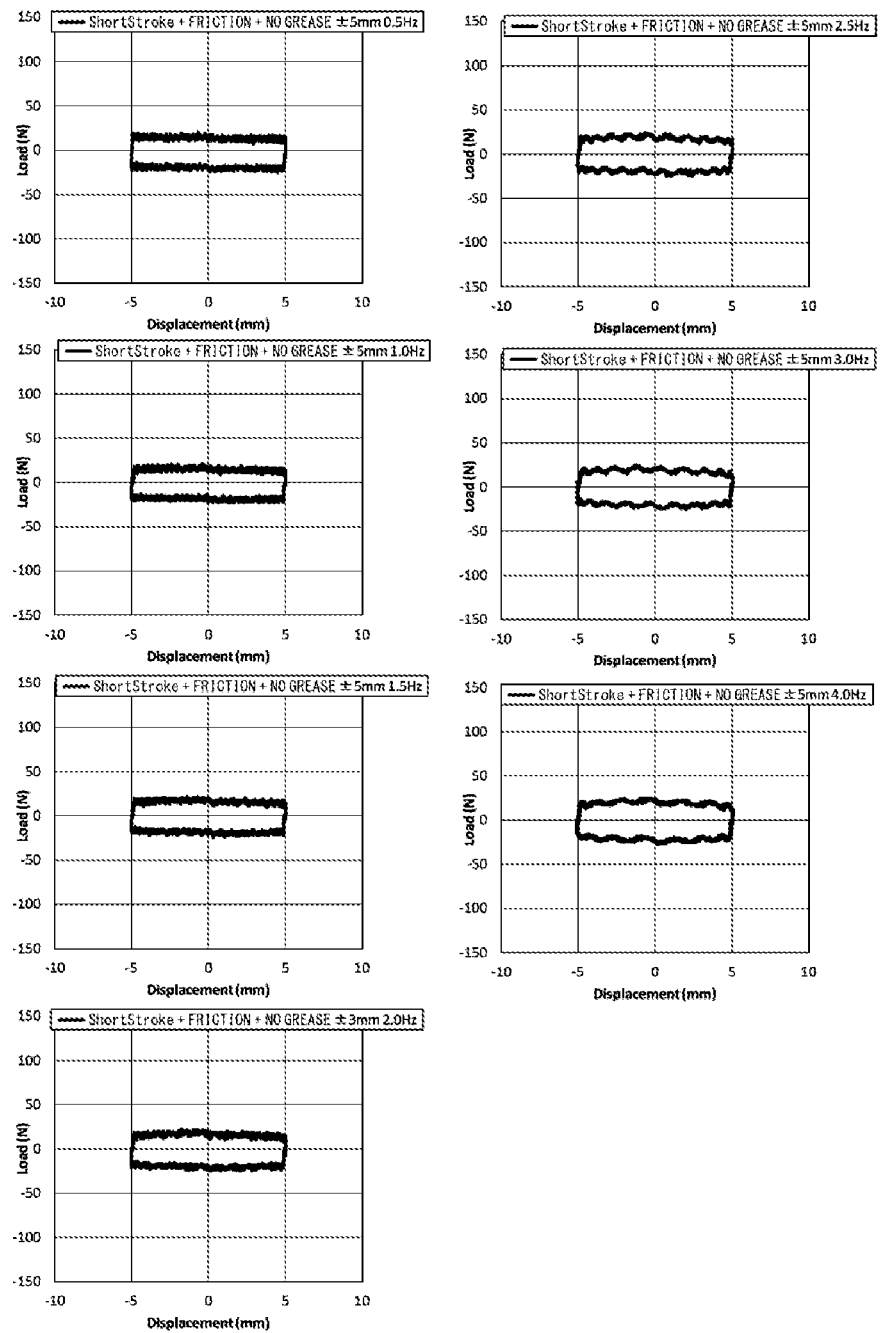
FIG. 11 illustrates charts of damping characteristics of the damper according to the comparative example under varied frequencies when vibration with a ±5 mm amplitude is given.
Figure 12:
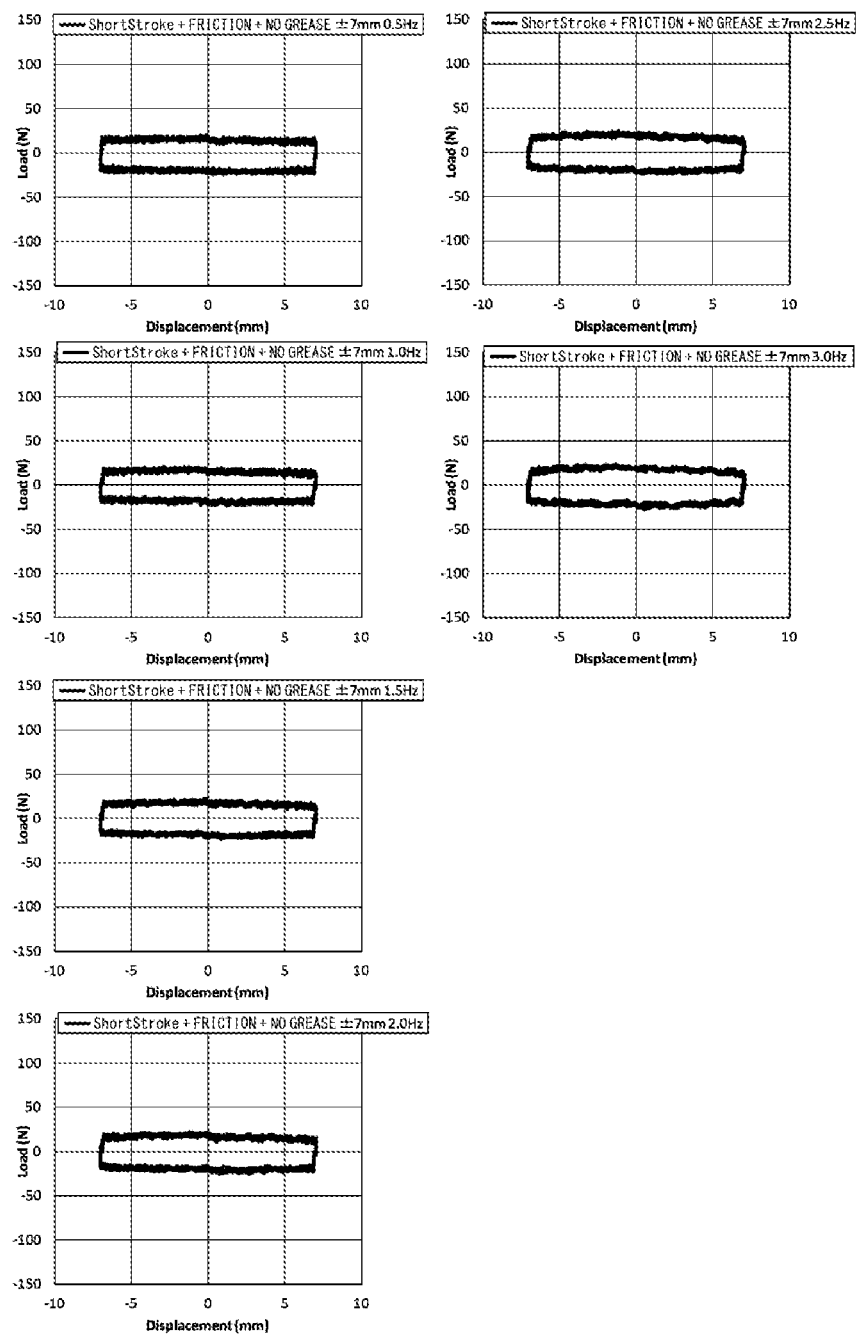
FIG. 12 illustrates charts of damping characteristics of the damper according to the comparative example under varied frequencies when vibration with a ±7 mm amplitude is given.

The comparison between these shows that, when the amplitude is ±1 mm and the frequency is 1 Hz or more, the damper 1 of this embodiment (refer to FIG. 5) absorbs a larger amount of energy by the damping than the damper of the comparative example (refer to FIG. 9). Further, in the damper 1 of this embodiment, the left sides of the whole shapes of the Lissajous figures prominently rise more than in the comparative example. This indicates that the elastic force due to the tension of the line-shaped member 32 acts in the same direction as the displacement direction of the piston 3, and the speed-dependent viscous force is generated. However, in FIG. 6 which show data of the damper 1 of this embodiment when the amplitude is ±3 mm, this spring characteristic disappears, and the Lissajous figures are those depicted by normal viscous force and friction force. Further, in FIG. 10 which show data of the damper of the comparative example when the amplitude is ±3 mm, the Lissajous figures are those depicted only by the friction force. This motion behavior when the amplitude is ±1 mm is the characteristic of the damper 1 of this embodiment using potential energy of the line-shaped member 32. Further, from the comparison of FIG. 7 and FIG. 8 which show data of the damper 1 of this embodiment with FIG. 11 and FIG. 12 which show data of the damper of the comparative example, it is seen that, due to the synergistic action of the friction damping and the viscous damping force, the energy absorption amount is larger in this embodiment than in the comparative example, and this is more distinguished as the frequency is higher.

Figure 13:
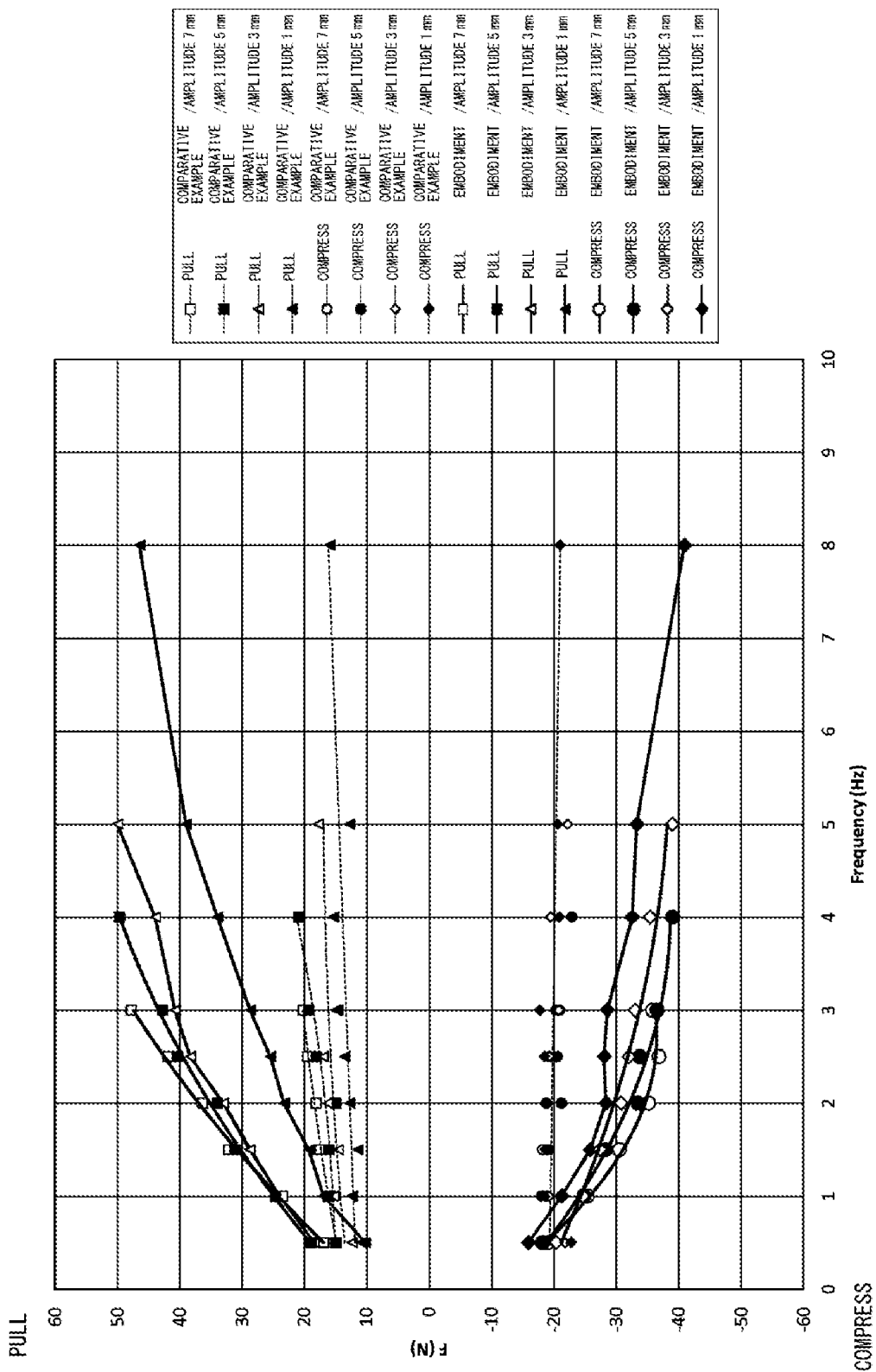
FIG. 13 is a graph illustrating relations between frequency (horizontal axis) and damping force (vertical axis) of the damper according to the embodiment and the damper of the comparative example.

FIG. 13 is a chart illustrating sequential line graphs which represent relations between the frequency and the damping force (the total damping force of the damper 1) of the damper 1 of this embodiment and the damper of the comparative example under the varied displacement amounts (amplitudes), using the experimental results in FIG. 5 to FIG. 12. Note that, in FIG. 13, "PULL" represents the damping force when the piston 3 is displaced in a separating direction from a bottom surface of the cylinder 2 with respect to a neutral point, and "COMPRESS" represents the damping force when the piston 3 is displaced in an approaching direction to the bottom surface of the cylinder 2 with respect to the neutral point.

As is seen in FIG. 13, the damper 1 of this embodiment has smaller damping force as the amplitude is smaller, but even when the amplitude is small, for example, when the amplitude is ±3 mm, it has higher damping force at any frequency than the comparative example not having the viscous fluid. Further, in the case of the ±1 mm amplitude as well, at 1 Hz or more, it has higher damping force than the comparative example not having the viscous fluid. However, when the amplitude is ±1 mm and the frequency is 0.5 Hz, on the "PULL" side, this embodiment has about 11 N and the comparative example has about 10 N and thus they have only a 1 N difference (a 10% difference from the damping force of the comparative example) and can be said as substantially equal. On the "COMPRESS" side, the damping force in terms of an absolute value is smaller than that of the comparative example. That is, the total damping force of the damper 1 of this embodiment is substantially equal to or less than that of the friction damper of the comparative example when the amplitude and speed are in predetermined ranges or less, specifically, when the amplitude is less than ±3 mm (for example, ±1 mm) and the frequency is less than 1 Hz (for example, 0.5 Hz) in the experimental results in FIG. 13. Therefore, the damper 1 of this embodiment has a characteristic that, when the displacement amount of the piston 3 is small, almost no frictional resistance is generated and it starts to smoothly move, and in addition, appropriate damping force can be exhibited owing to the action of the viscous fluid 4. Moreover, the damper 1 of this embodiment presents a tendency that the total damping force is lower as the frequency is lower, and irrespective of the amplitude, the damping force becomes higher as the frequency becomes higher, from which it is seen that the damper 1 of this embodiment has the speed-dependent characteristic. When the frequency is low, the wound portions 32a of the line-shaped member 32 are each likely to independently move as in FIG. 4(a), but as the frequency becomes high, the wound portions 32a move as a unit as in FIG. 4(b), so that the friction damping force increases, and in addition, the viscous damping force acts, resulting in the increase in the total damping force. Further, at any frequency, as the amplitude increases, the damping force increases, from which it is seen that the damper 1 of this embodiment has the displacement-dependent damping characteristic. On the other hand, it is seen that the comparative example not having the viscous fluid has substantially the constant damping force even if the frequency changes, and exhibits slightly smaller damping force even when the amplitude increases, as compared with the damper 1 of this embodiment.

That is, the damper 1 of this embodiment exhibits a negative spring characteristic that, when the amplitude is ±1 mm, that is, at the start of the movement of the piston 3, the force reduces due to the aforesaid torsional stress and tension of the line-shaped member 32, and this operation makes the piston 3 easily move. In addition, when the speed is low, the friction force rapidly decreases due to the viscous fluid 4, and this characteristic is also a factor to make the piston 3 easily move. Due to these sensitivities exhibited at the start of the movement, the graphs of the damper 1 of this embodiment in the case of ±1 mm in FIG. 13 presents nonlinear characteristics at and over 1 Hz. Further, as the piston 3 has a higher speed, higher viscous damping force acts. This damper 1 can be said as, for example, a sliding structure having a characteristic of a link mechanism having small friction, and accordingly smoothly moves at the start and with an increase in the displacement and speed, exhibits high damping force. As a result, the resonant frequency of a control target structure (for example, a seat suspension) to which the damper 1 of this embodiment is attached is less susceptible to the damping force and becomes a frequency according to a spring constant of a spring mechanism of the structure, but a gain is small due to the damping force of the damper 1 and a high damping effect is obtained.

Figure 14:
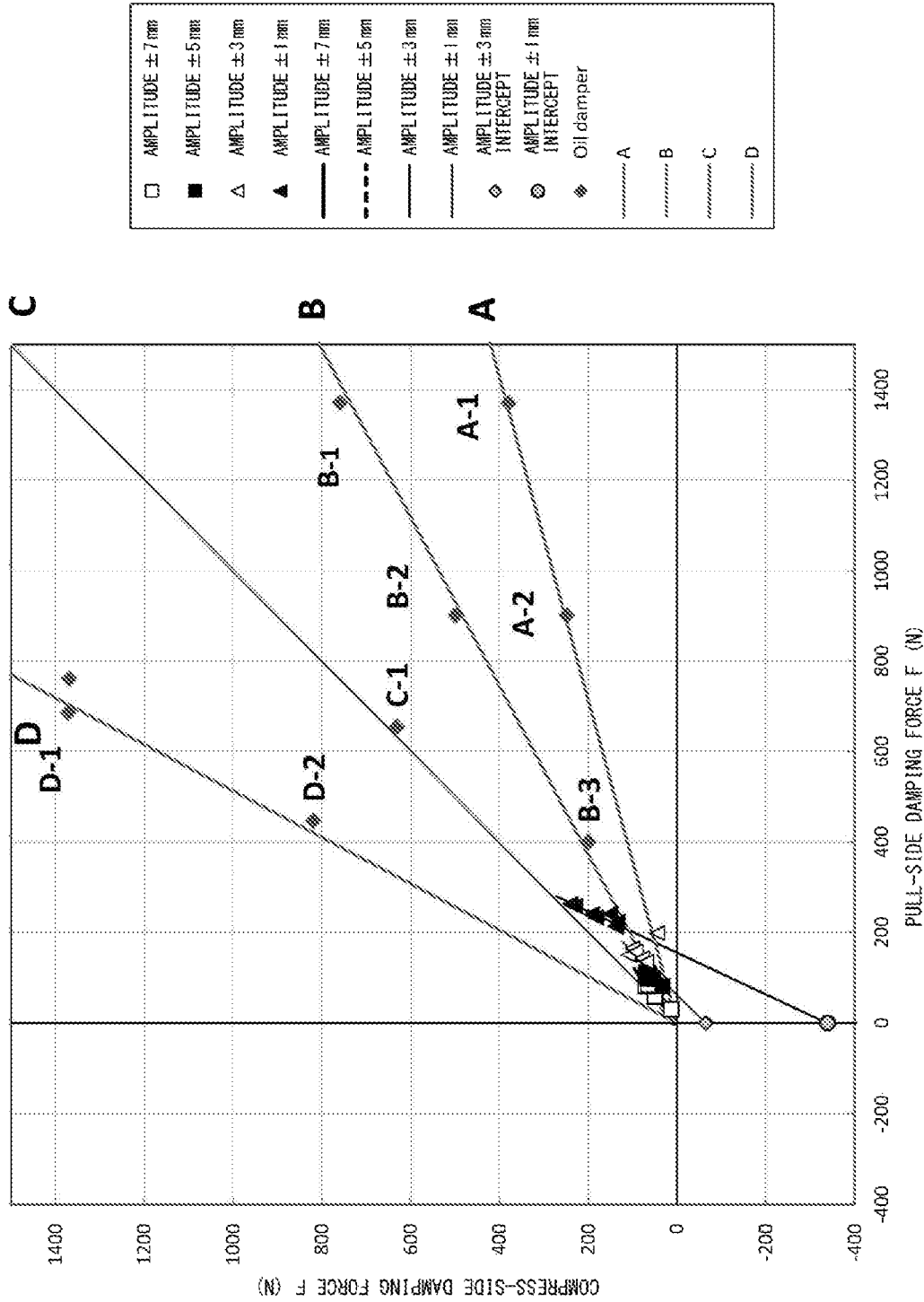
FIG. 14 is a graph illustrating analysis values of the damping force of the damper according to the embodiment when the speed is 0.3 m/s, together with damping forces of known oil dampers when the speed is 0.3 m/s.
Figure 15:
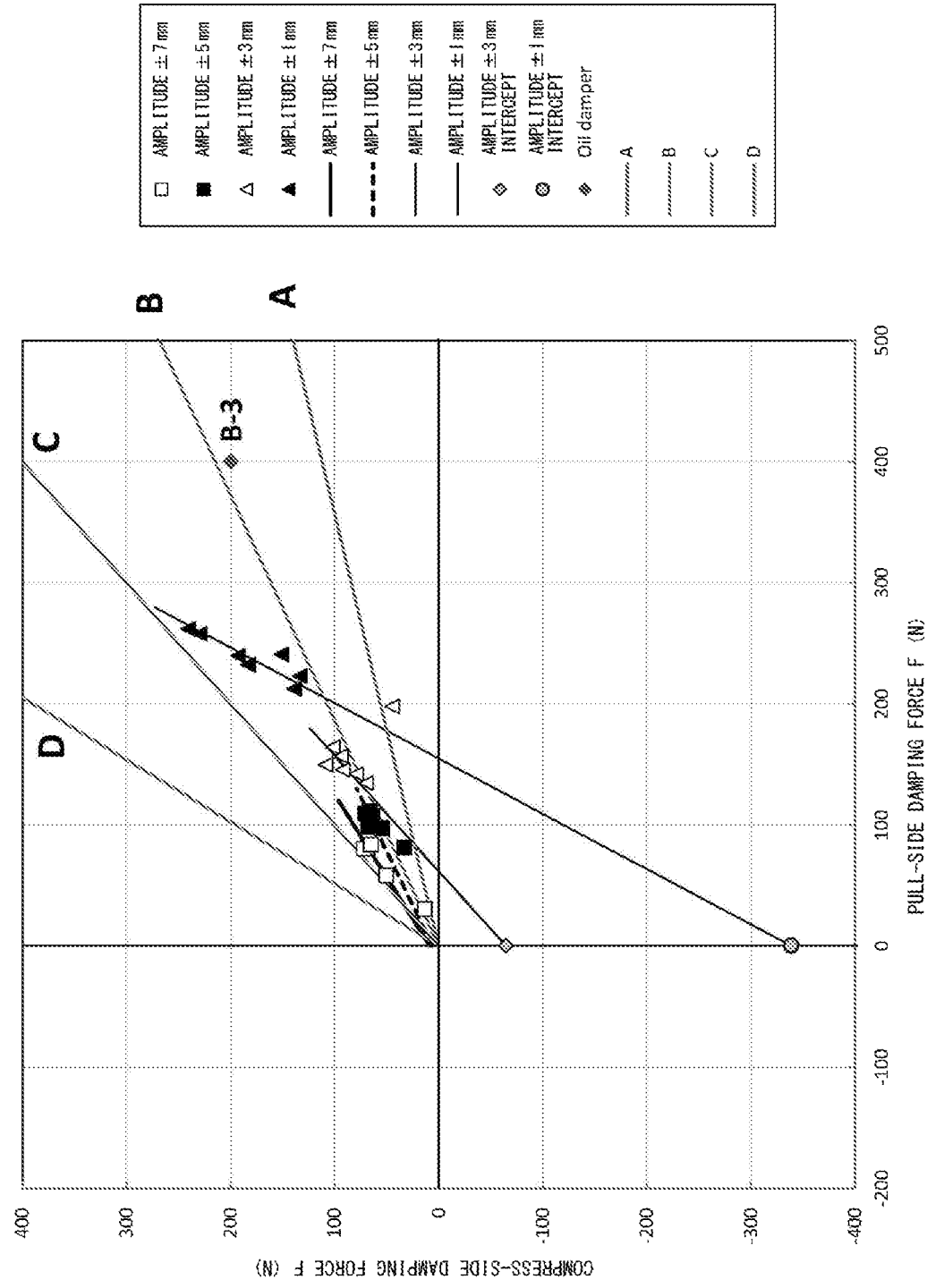
FIG. 15 is an enlarged graph illustrating the data of the damper according to the embodiment in FIG. 14.

FIG. 14 is a graph which plots the damping force when the data in FIG. 13 are converted assuming that the moving speed of the piston 3 is 0.3 m/s, with the pull-side damping force taken on the horizontal axis and the compress-side damping force taken on the vertical axis, and also shows the characteristics of various conventionally known oil dampers. FIG. 15 is an enlarged graph showing the range where the damping force of this embodiment appears in FIG. 14. It is also seen from these drawings that the characteristic exhibited by the damper 1 of this embodiment differs depending on each amplitude. In the case of the small amplitudes of ±1 mm and ±3 mm, higher damping force is exhibited than in the case of the large amplitudes of ±5 mm and ±7 mm. This relation is converse to the relation in the data in FIG. 13, but a possible reason why such a characteristic is exhibited is that, at the high moving speed of 0.3 m/s, a slip occurs due to the grease applied as the viscous fluid 4. Therefore, when used in a later-described seat suspension 100 mounted on an automobile, in a case where the frequency is in a high range (around 5 to 10 Hz range at which secondary resonance occurs), in which case the amplitude is usually small, the damper 1 of this embodiment exhibits high damping force to thereby reduce the transmissibility of vibration in the high-frequency range, while, in a case where the frequency is in a low-range (around 3 to 4 Hz range at which resonance (main resonance) occurs), in which case the amplitude is large, it has small damping force, and accordingly a vibration absorbing function by a spring mechanism provided in the seat suspension 100 mainly works, and the damper 1 is used so as to reduce the transmissibility of the vibration at around the resonance point. That is, according to the damper 1 of this embodiment, it is possible to damp the vibration by the damping force according to the vibration frequency.

Further, it is seen from the data in the cases of the small amplitudes of ±1 mm and ±3 mm that the intercepts of the compress-side damping force on the is vertical axis are in a negative range. This indicates that, as the amplitude is smaller and the frequency is lower, that is, at the start of the movement, almost no resistance acts and the movement becomes smooth. For reference, when the damping force characteristics of the plurality of conventionally known oil dampers were studied, their damping forces were plotted near four straight lines A to D. Any of the intercepts of the straight lines A to D on the vertical axis does not become negative, and actually, the oil dampers all moved very badly when the amplitude was small such as ±1 mm.

Figure 16:
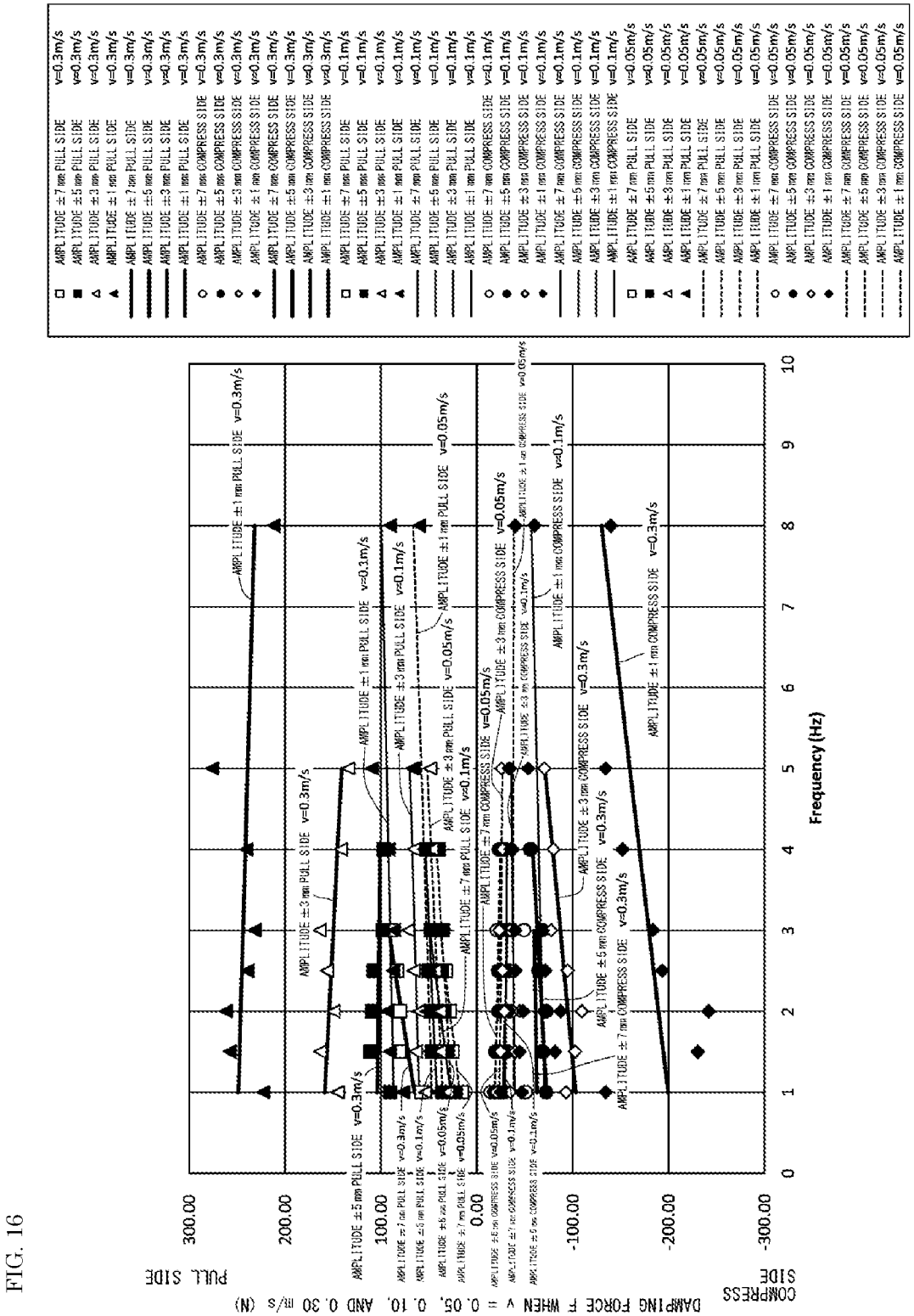
FIG. 16 is a graph illustrating analysis values of damping force of the damper according to the embodiment in relation to frequency when the speed is 0.3 m/s, 0.1 m/s, and 0.05 m/s.

Further, FIG. 16 is a graph illustrating not only analysis values of the damping force when the moving speed of the piston 3 is 0.3 m/s in FIG. 14 but also analysis values of the damping force when it is 0.1 m/s and 0.05 m/s, in relation to the frequency. It is seen from FIG. 16 that the damping force changes depending on the amplitude when the speed is any of the above.

The damper 1 of this embodiment is attached to a control-target structure in which, relative to one member, the other member is displaced. For example, FIG. 17 to FIG. 22 illustrate the seat suspension 100 supporting a seat of an automobile, with its upper frame 110 having the seat set thereon and with its lower frame 120 fixed to a vehicle body floor.

Between the upper frame 110 and the lower frame 120, link members 130, 130 in a substantially right triangular shape are disposed on both sides, with their hypotenuse portions 131, 131 facing a rear obliquely downward direction. Portions near substantially right-angled corners of the link members 130, 130 in the substantially right triangular shape are rotation centers 132, 132 supported by the lower frame 120, and portions near corners 133, 133 located rearward are supported by the upper frame 110. Between the vicinities of lower portions of the rotation centers 132, 132, an upper pipe frame 112 is extended, and near the middle of the upper pipe frame 112, two brackets 113, 113 extending downward are provided a predetermined interval apart from each other. Between the two brackets 113, 113, is the end portion 31a of the piston rod 31 is supported with a shaft pin 114.

Further, between the vicinities of the front-rear direction middles of both side frames 121, 121 of the lower frame 120, a second pipe frame 122 is extended. Near the middle of the second pipe frame 122, two brackets 123, 123 are provided a predetermined interval apart from each other, and between the two brackets 123, 123, the coupling portion 2a of the cylinder 2 is supported with a shaft pin 124.

Figure 20:
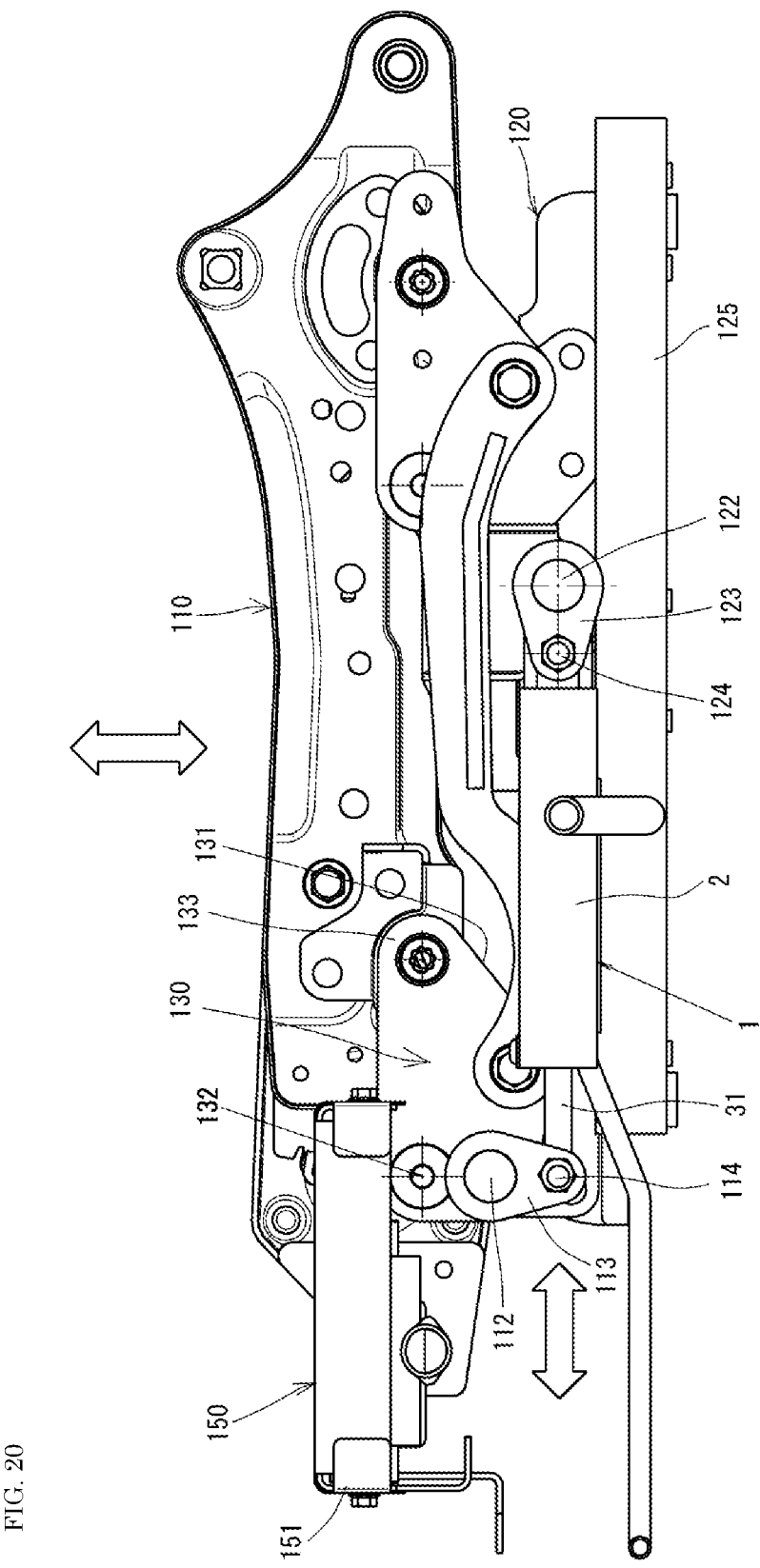
FIG. 20 is a sectional view taken along A-A line in FIG. 19.
Figure 21:
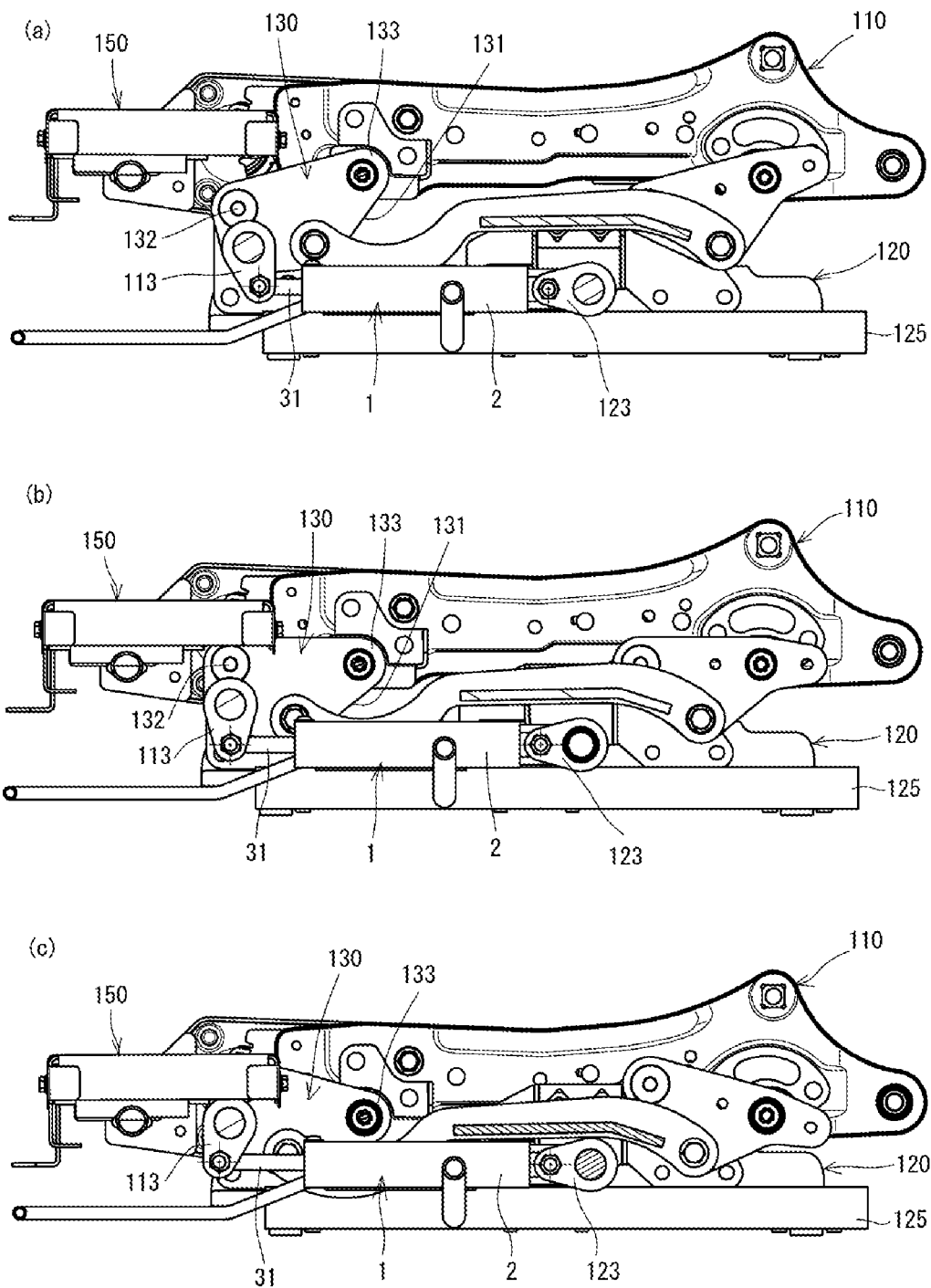
FIGS. 21(a) to (c) are explanatory views of the movement of the seat suspension in FIG. 17, FIG. 21(a) illustrating a state where it moves up from a neutral position by 20 mm, FIG. 21(b) illustrating a state where it is at the neutral position, and FIG. 21(c) illustrating a state where it moves down from the neutral position by 20 mm.

Here, as illustrated in FIG. 20 and FIG. 21, by supporting the piston rod 31 with the pair of link members 130, 130, the upper frame 110, the brackets 113, 113, and the shaft pin 114, a support height of the piston rod 31 is set so as to be near the lower frame 120. This allows the damper 1 to be disposed substantially horizontally near the lower frame 120, for example, at a position slightly higher than lower rails 125 of sliders.

If an oil damper is used as a damping means of the seat suspension 100, it cannot be disposed horizontally due to a need for preventing the mixture of bubbles, and has to be disposed obliquely between the upper frame 110 and the lower frame 120. This limitation in the arrangement posture is one factor inhibiting a further thickness reduction of the seat suspension 100. On the other hand, in the damper 1 of this embodiment, the viscous fluid 4, preferably grease having the aforesaid penetration, is made to adhere to the line-shaped member 32. This eliminates the limitation in the arrangement posture, and as illustrated in FIG. 17 to FIG. 22, the substantially horizontal arrangement is possible, and therefore, the use of the damper 1 of this embodiment can contribute to a further thickness reduction of the seat suspension 100.

According to this seat suspension 100, the up and down movement of the upper frame 110 causes the pair of link members 130, 130 to pivot on the rotation centers 132, 132 coupled to the lower frame 10. Consequently, the upper pipe frame 112 and the two brackets 113, 113 extending downward turn back and forth, and as illustrated in FIGS. 21(a) to (c), the piston rod 31 extends/retracts from/toward the cylinder 2 depending on the relative position of the upper frame 110 to the lower frame 120 to change the relative position of the piston 3 in the cylinder 2. According to whether the displacement amount is large or small and whether the displacement speed is high or low at this time, the damping characteristic corresponding to each case acts, as described above.

Figure 17:
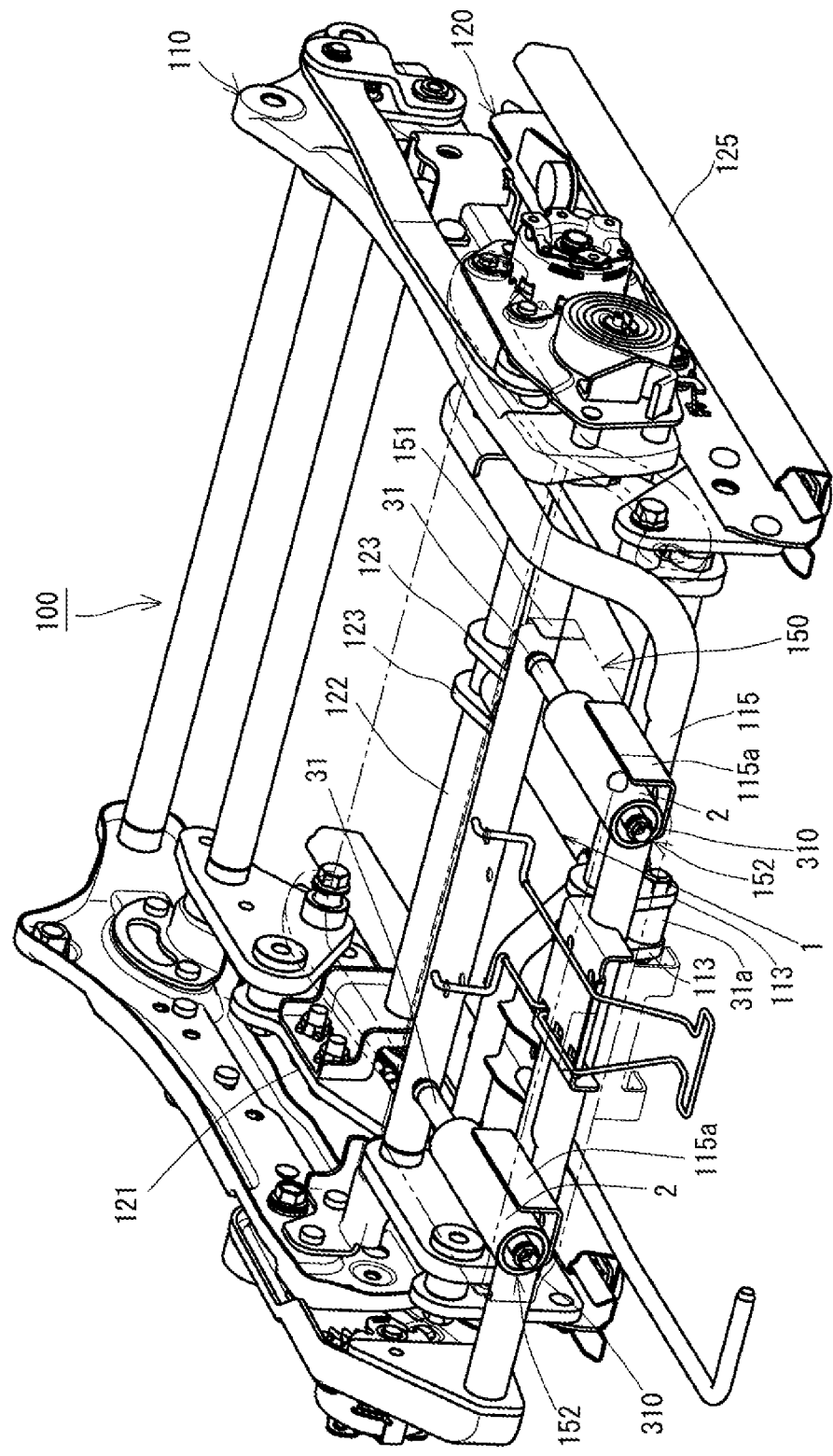
FIG. 17 is a perspective view illustrating an example of a seat suspension where the damper according to the embodiment is disposed.
Figure 18:
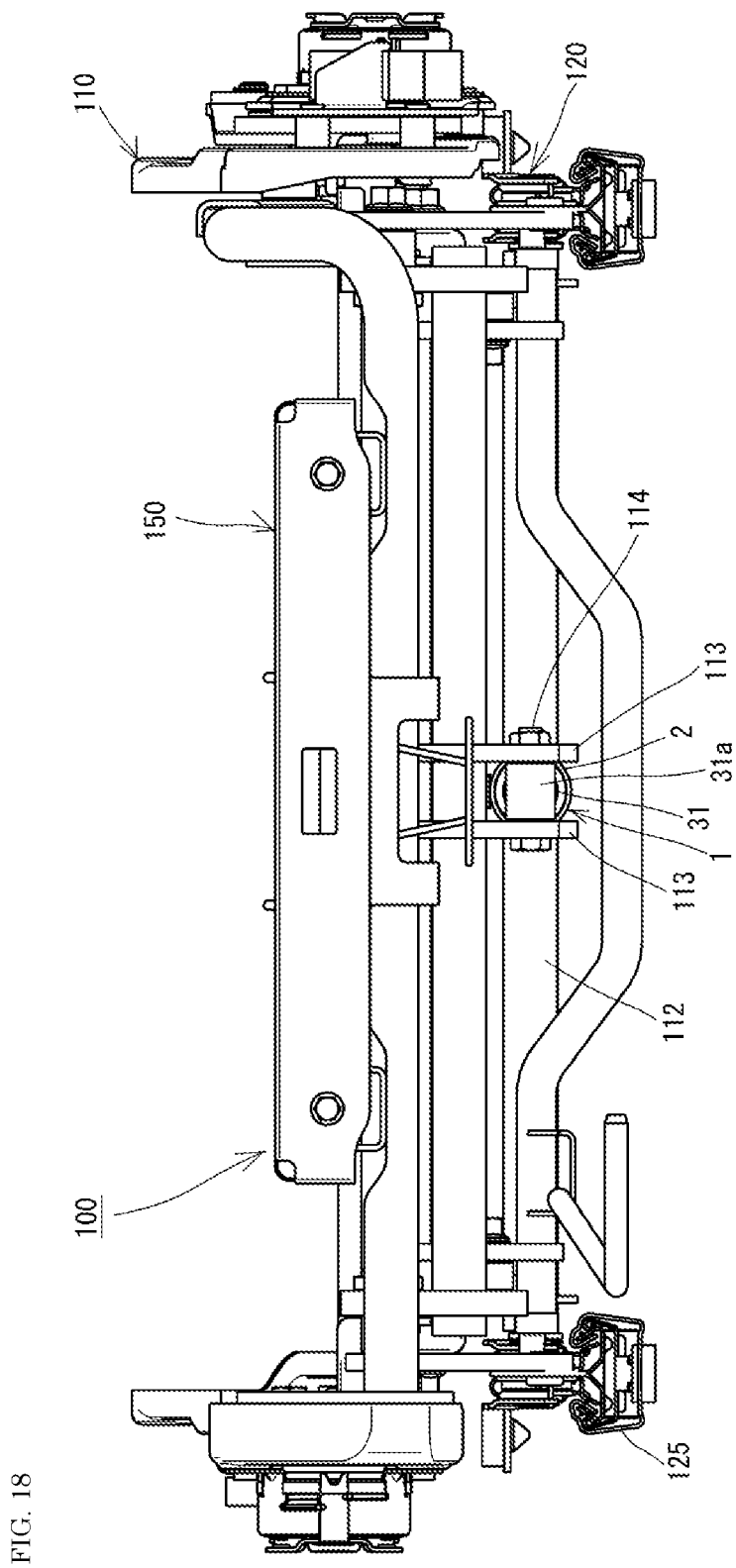
FIG. 18 is a front view of FIG. 17.
Figure 19:
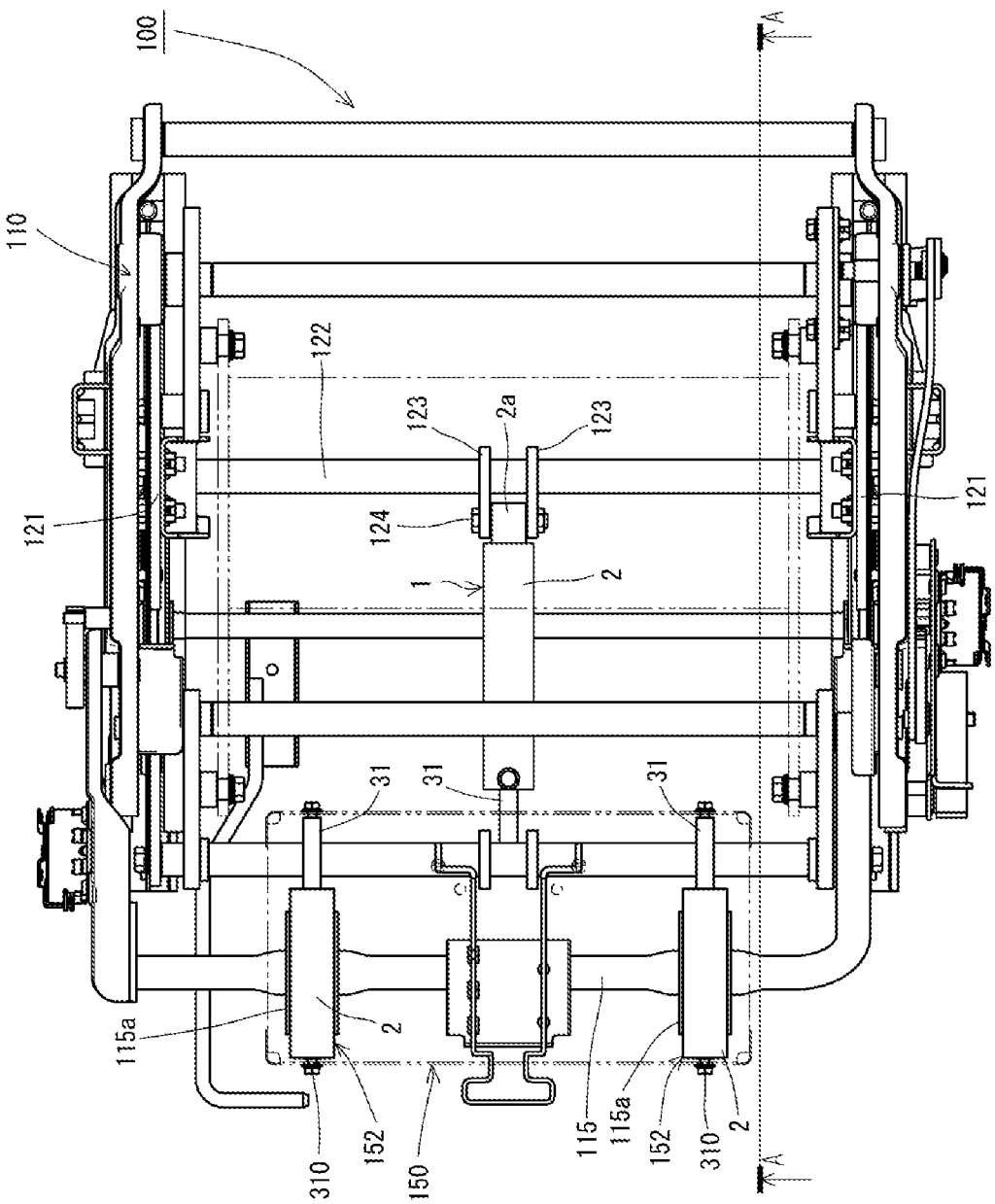
FIG. 19 is a plane view of FIG. 17.

Here, on the upper frame 110 of the seat suspension 100 in FIG. 17 to FIG. 22, a front-rear position adjusting part 150 which adjusts a front-rear position of a cushioning member for seat cushion supported by the upper frame 110 is provided. The front-rear position adjusting part 150 has a front-rear position adjusting frame 151, a pair of guide members 152, 152 provided a predetermined interval apart from each other in a width direction, and so on as illustrated in FIG. 17, and as the guide members 152, 152, the mechanism of the damper 1 of the above-described embodiment is used.

Figure 22:
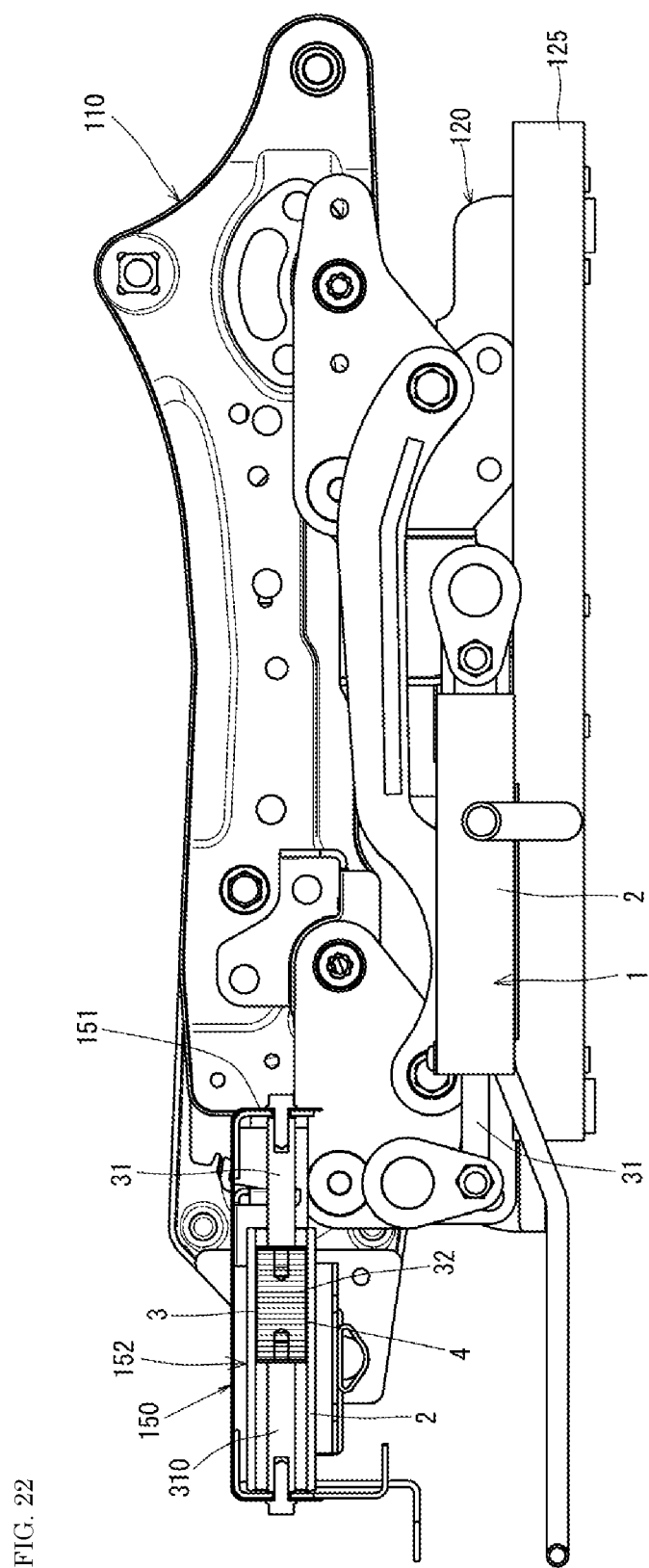
FIG. 22 is a view illustrating an example where the damper of the embodiment is employed as guide members of a front-rear position adjusting part provided in the seat suspension in FIG. 17.

Specifically, cylinders 2 of the guide members 152 corresponding to the damper 1 are fixed to a front edge frame 115 with brackets 115a, and piston rods 31, 310 are coupled to the front-rear position adjusting frame 151. Incidentally, the guide members 152 are different in structure from the damper 1 of the above-described embodiment in that the piston rods 31, 310 protrude from both end portions of the pistons 3 disposed in the cylinders 2 as illustrated in FIG. 22. This is intended to stably guide the front-rear position adjusting frame 151 by coupling the piston rods 31 to a rear portion of the front-rear position adjusting frame 151 and coupling the other piston rods 310 to a front portion of the front-rear position adjusting frame 152. However, line-shaped members 32 are wound around the pistons 3 and are impregnated with viscous fluids, as in the embodiment described above.

Owing to such a structure of the front-rear position adjusting part 150, the front-rear movement of the front-rear position adjusting frame 151 causes, via the piston rods 31, 310, the pistons 3 to move in the cylinders 2. At this time, the line-shaped members 32 wound around the pistons 3 deform and change in tension, and accordingly the viscous damping force of the viscous fluids and the friction damping force by the line-shaped members 32 act, as described above. That is, for example, an attempt to slow down the movement of the front-rear position adjusting frame 151 using a conventionally known friction damper may involve a possibility of difficulty in operation when the displacement amount is small, but the structure using the damper 1 of this embodiment makes it possible for the damping force to work according to an operation speed and an adjustment amount. Therefore, at the start of the movement, it is possible to achieve a smooth and sophisticated movement according to the operation speed and the adjustment amount, while viscosity like that obtained when, for example, butter is cut with a butter knife acts. The damper 1 of this embodiment can be horizontally arranged as described above and thus is applicable as the guide members 152, 152 of such a front-rear position adjusting part.

Experimental Example 2

An automobile seat in which the seat suspension 100 in FIG. 17 to FIG. 22 was assembled was set on a vibrator and a vibration experiment was conducted. Specifically, based on JIS A 8304:2001 (ISO 7096:2000), a SEAT factor (Seat Effective Amplitude Transmissibility factor) was found. The experiment was conducted on two subjects with a 55 kg weight and with a 98 kg weight respectively, under input spectral class EM6 (excitation center frequency 7.6, the maximum value of PSD 0.34 $(m/s^2)^2/Hz$) which is a standard for "crawler tractor-dozers of 50,000 kg or less". As a result, average values of the obtained SEAT factors were 0.54 and 0.52. Since the standard of the SEAT factor of EM6 is less than 0.7, these values satisfied the standard.

In the case of the automobile seat, the use of a seat cushioning part having a 1 to 3 kg/mm spring constant often results in a characteristic that secondary resonance appears near 5 to 8 Hz. In order to reduce this secondary resonance, it is practiced to set the spring constant of the seat cushioning part to 0 to 1 kg/mm by adopting a predetermined seat suspension. However, many of seat suspensions having such a function are expensive and heavy. In this respect, the seat suspension 100 adopting the damper 1 of this embodiment including the line-shaped member 32 to which the viscous fluid 4 is made to adhere has features of being inexpensive and not very heavy owing to the simple structure of the damper 1. However, a resonance point tends to be near 4 to 5 Hz and thus slightly high. On the other hand, the SEAT factors obtained in the aforesaid vibration experiment under EM6, which correspond to the transmissibility of vibration near 5 to 8 Hz, indicate that the transmissibility of vibration in this range is low, and it can be said that this structure is capable of reducing secondary resonance. This is because, when the frequency is high, the aforesaid damper 1 has the characteristic of exhibiting high damping force and damping coefficient even if the amplitude is small.

Figure 23:
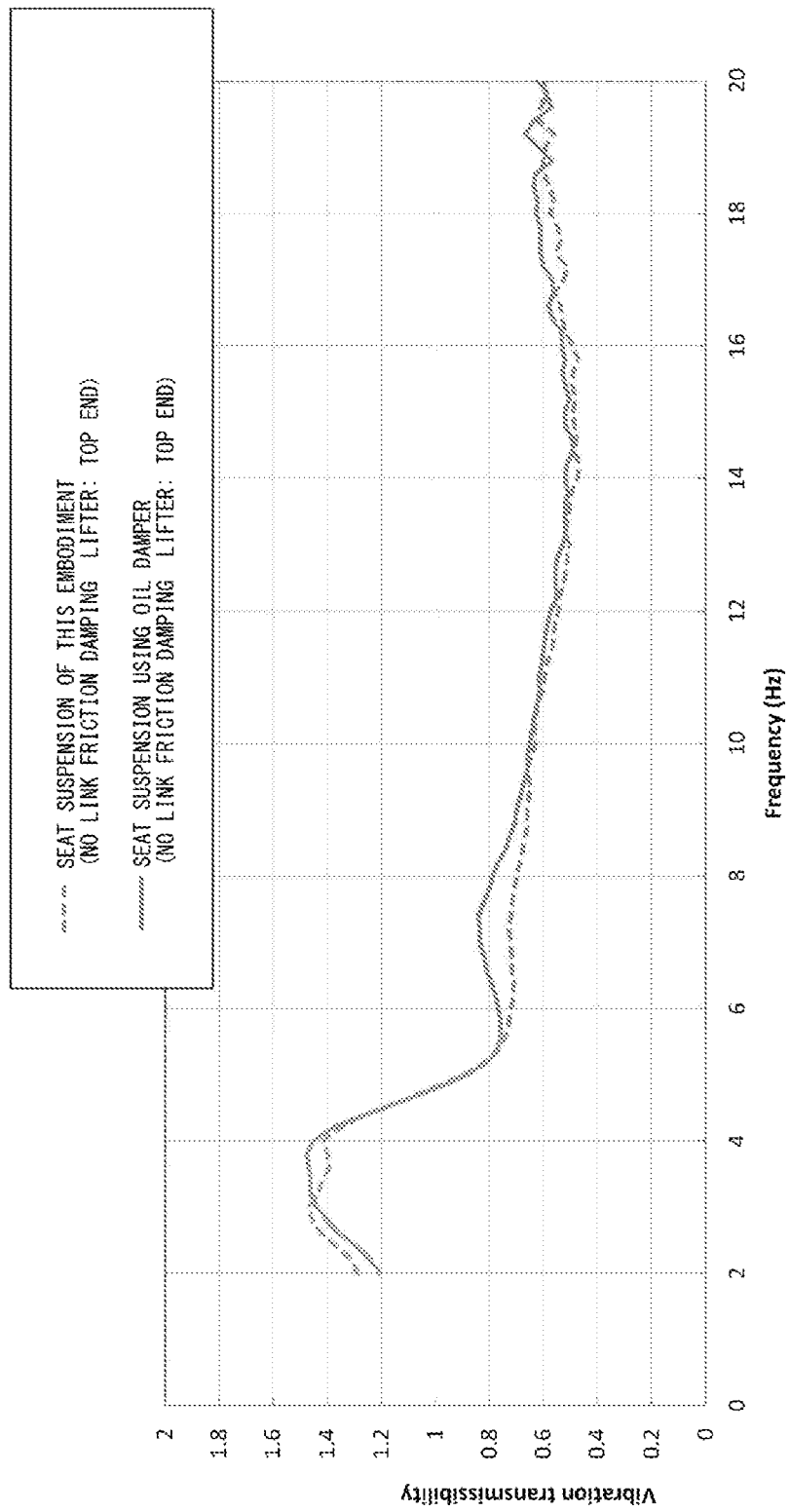
FIG. 23 is a chart illustrating vibration transmissibility in vibration experiments.

FIG. 23 is a graph showing the vibration transmissibility in the vibration experiments conducted under the aforesaid input spectral class EM6. In FIG. 23, "SEAT SUSPENSION OF THIS EMBODIMENT" represents data of the seat suspension 100 in FIG. 17 to FIG. 22 adopting the damper 1 of this embodiment, and "SEAT SUSPENSION USING OIL DAMPER" represents data of a seat suspension using, instead of the damper 1 of this embodiment, an oil damper obliquely disposed between an upper frame and a lower frame. Note that the oil damper used here has the damping force B-3 shown in FIG. 14 and FIG. 15, that is, has damping force about equal to that of the damper 1 of this embodiment, and the experiments were both conducted while the subject with a 98 kg weight was seated.

It is seen from FIG. 23 that, in "SEAT SUSPENSION USING OIL DAMPER", the resonance point is near 3 Hz but the secondary resonance point is present near 7 Hz. On the other hand, it is seen that, in "SEAT SUSPENSION OF THIS EMBODIMENT", the resonance point is on a slightly higher-frequency side and is about 4 Hz as compared with that in "SEAT SUSPENSION USING OIL DAMPER", but the secondary resonance point does not appear near 5 to 8 Hz. The data in FIG. 23 also backs up that the damper 1 of this embodiment has high damping force and damping coefficient in a small-amplitude and high-frequency range.

Figure 24:
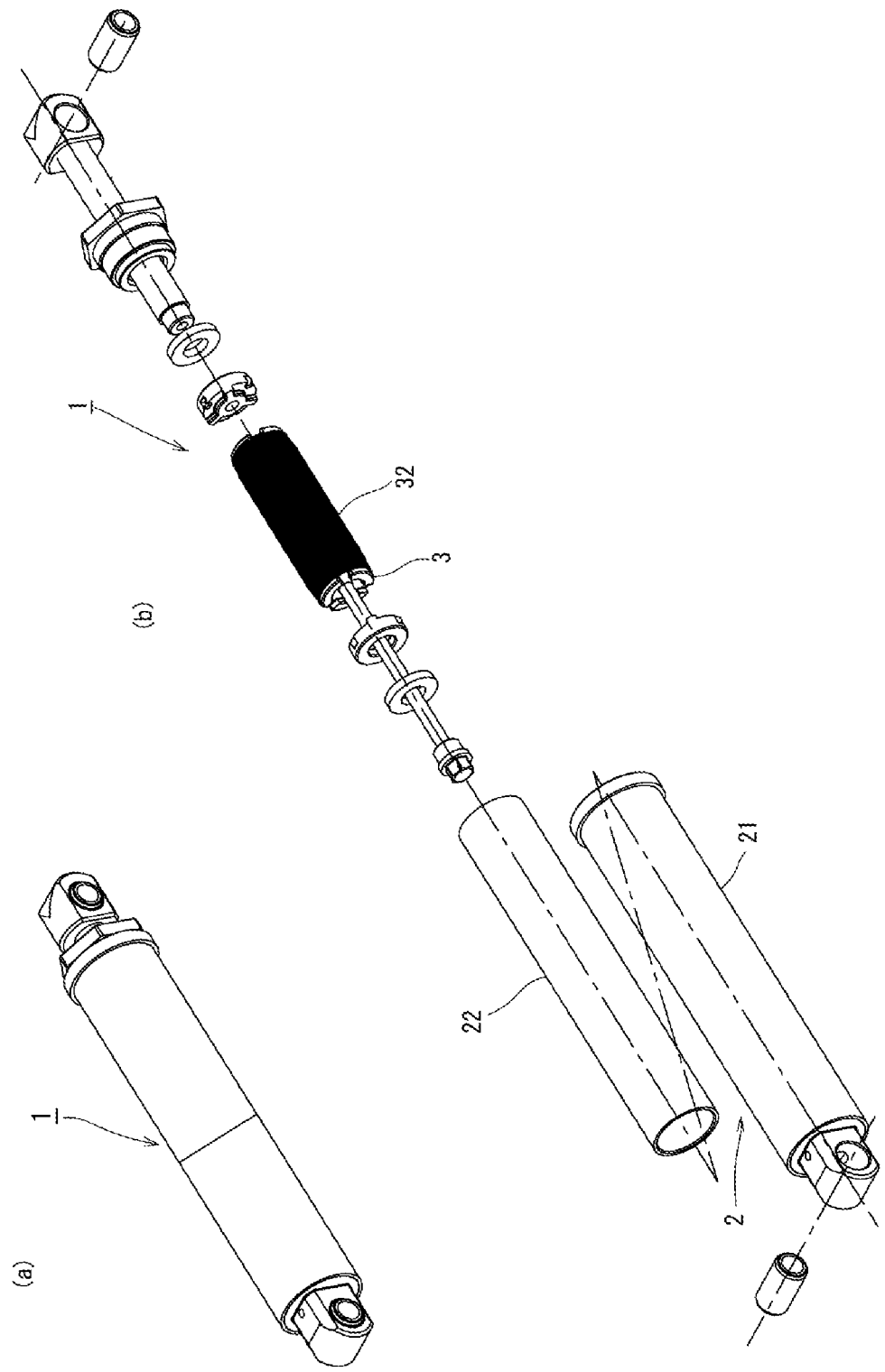
FIG. 24(a) is a perspective view illustrating the appearance of a damper according to another mode.
FIG. 24(b) is an exploded perspective view thereof.
Figure 25:
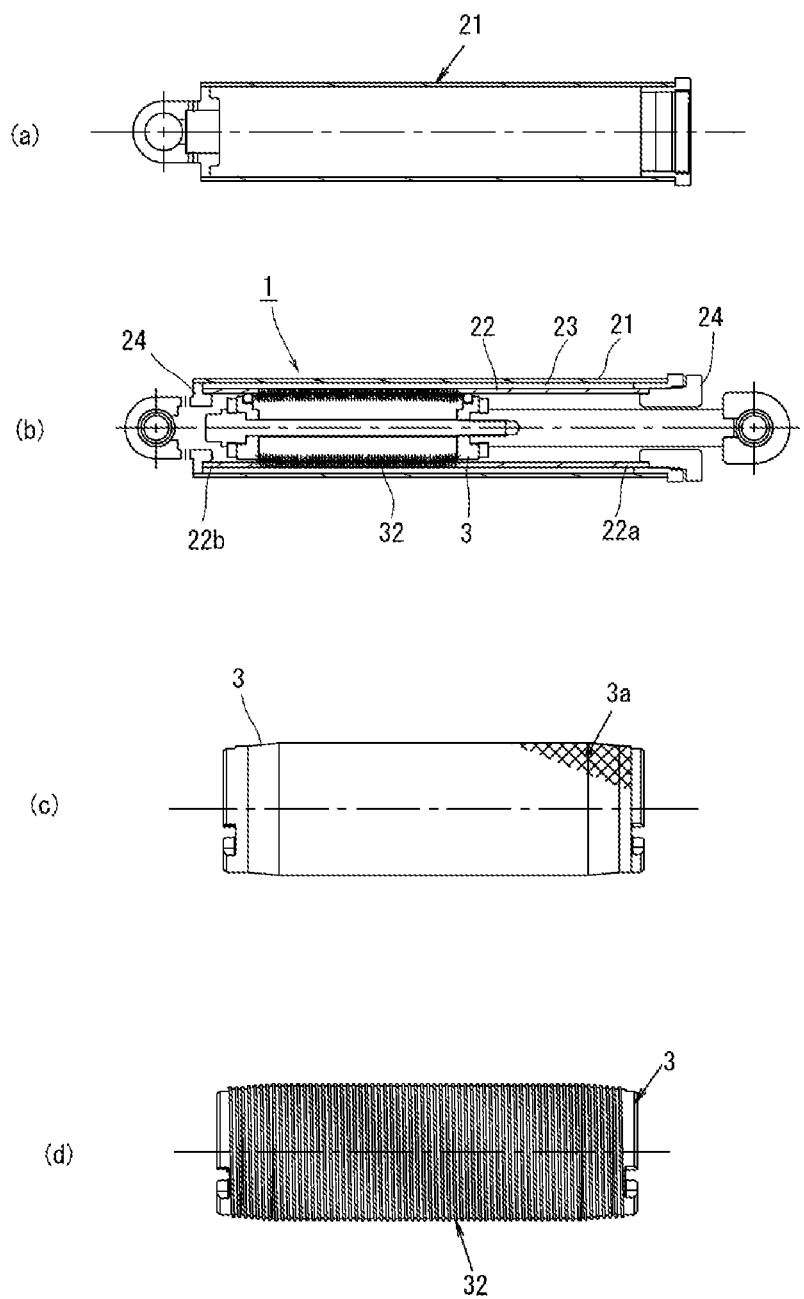
FIG. 25(a) is a sectional view illustrating an outer cylinder of the damper according to the mode in FIGS. 24(a), (b)
FIG. 25(b) is a sectional view of the damper according to the mode in FIGS. 24(a), (b)
FIG. 25(c) is a side view illustrating a piston of the damper according to the mode in FIGS. 24(a), (b)
FIG. 25(d) is a side view illustrating a state where a line-shaped member is wound around the piston.

FIG. 24 and FIG. 25 illustrate a mode in which the cylinder 2 of the damper 1 is composed of an outer cylinder 21 and an inner cylinder 22. The outer cylinder 21 is formed of steel in consideration of strength, while the inner cylinder 22 is formed of an extruded product of an aluminum alloy. Further, the inner cylinder 22 is disposed in the outer cylinder 21 with a gap 23 therebetween. Longitudinal-direction end portions 22a, 22b of the inner cylinder 22 are fixed by cap members 24, 24 fit to end portions of the outer cylinder 21. In the inner cylinder 22, the piston 3 is slidably disposed. Around an outer peripheral surface 3a of the piston 3, the line-shaped member 32 is wound as in the above-described embodiment, but in this mode, in order to inhibit the displacement of the line-shaped member 32, an outer peripheral surface 3a of the piston 3 is an anti-skid surface such as a knurled surface. Note that the other structure such as that the viscous fluid is made to adhere to the line-shaped member 32 is the same as that of the mode illustrated in FIG. 1 to FIG. 4.

According to the damper 1 of the mode illustrated in FIG. 24 and FIG. 25, owing to the inner cylinder 22 formed of the extruded product of the aluminum alloy, an inner peripheral surface is smooth and thus the line-shaped member 32 sliding in contact on the inner peripheral surface is not caught on the inner peripheral surface during the operation, which achieves a smooth movement. Consequently, it is possible for the line-shaped member 32 to effectively exhibit the aforesaid operations, specifically, the operation that, when the displacement amount of the piston 3 is a small amplitude, the torsional deformation occurs in the wound portions 32a of the line-shaped member 32 (refer to FIG. 4(a)) and the piston 3 speedily starts to move; the operation that, when the amplitude is large, the wound portions 32a deform as a unit (refer to FIG. 4(b)) and consequently the contact area of the line-shaped member 32 and the inner peripheral surface of the cylinder 2 becomes larger than that when the amplitude is small, and the total friction force becomes high; and so on. Further, the inner cylinder 22 is disposed with the gap 23 from the outer cylinder 21. If the inner cylinder 22 made of the aluminum alloy is disposed in close contact with the outer cylinder 21 made of the steel, there is a possibility that, when the inner cylinder 22 undergoes a thermal expansion change due to heat accompanying the sliding of the piston 3, the inner cylinder 22 deforms such that its longitudinal-direction middle portion protrudes inward because the longitudinal-direction end portions 22a, 22b of the inner cylinder 22 are restricted by the cap members 24, 24. On the other hand, in the mode in FIG. 24 and FIG. 25, since the gap 23 from the outer cylinder 21 is present, the gap 23 can absorb the thermal expansion deformation of the inner cylinder 22, and the smooth operation of the piston 3 is not obstructed.

In the above-described embodiment, the viscous fluid 4 adhering to the line-shaped member 32 is used as the viscous damping element, but it is also possible to constitute the cylinder 2 and the piston 3, which are the casing and the movable body, using a permanent magnet and a conductor, and to constitute the viscous damping element by a magnetic field formed by the permanent magnet and the conductor. For example, the structure of the magnetic damper disclosed in Japanese Patent Application Laid-open No. 2011-241933 is applicable. In this magnetic damper, the cylinder 2 is formed of a conductor such as copper and the piston 3 is formed of permanent magnets which are arranged along the axial direction, with their same poles facing each other. Further, an outer peripheral surface of the cylinder 2 is covered by a yoke and a yoke is also interposed between the permanent magnets of the piston 3. In such a magnetic damper, in accordance with the reciprocal movement of the piston 3 in the cylinder 2, the magnetic field changes, and an induced current is generated in the conductor to convert vibrational energy to thermal energy, whereby speed-dependent viscous damping force is exhibited. Therefore, by adjusting the magnetic field, which is the viscous damping element, by the selection of the material of the permanent magnets, the presence/absence of the yoke, or the like, it is possible to obtain various viscous damping forces.

Incidentally, in the case where such a magnetic damper structure is adopted as well, the line-shaped member 32 is wound around the piston 3. Consequently, friction damping force acts between the line-shaped member 32 and the inner peripheral surface of the cylinder 2 as in the above-described embodiment.

The damper of the present invention, in particular, the telescopic damper, is usable in a seat suspension for supporting a seat of a vehicle, a suspension disposed between a wheel and a vehicle body, or the like. Further, it is not only usable in vehicles but also usable in any of various kinds of industrial apparatuses while disposed between members which make a relative motion. Further, in a joint part of a robot, a hinge part of a door, a door closer, a hinge part of a laptop personal computer or the like, it is also usable as a member for vibration absorption or impact buffering, or for slowing down the movement of a control target such as a door. Incidentally, when it is used in a hinge part of a door, a door closer, or the like which makes a rotational operation, it can have a rotary damper structure. In this case, it is possible to achieve the same functions as those in the above-described embodiment by winding the line-shaped member around an outer peripheral surface of a rotor rotatably disposed in the casing.

EXPLANATION OF REFERENCE SIGNS 1 damper
2 cylinder
3 piston
31, 310 piston rod
32 line-shaped member
32a wound portion
4 viscous fluid
100 seat suspension
110 upper frame
120 lower frame

The invention claimed is:

1. A damper which includes a casing and a movable body which makes a relative motion in the casing, the damper comprising:
   a line-shaped member which is wound around an outer peripheral surface of the movable body and exhibits friction damping force against the casing during the relative motion; and
   a viscous damping element which exhibits viscous damping force due to the relative motion of the casing and the movable body,
   wherein the line-shaped member changes in tension according to the relative motion and has a function of changing the friction damping force between the line-shaped member and the casing and the viscous damping force of the viscous damping element to change total damping force which is a sum of the friction damping force and the viscous damping force, according to an amplitude and a speed during the relative motion, and
   wherein the damper is a telescopic damper in which the casing is a cylinder and the movable body is a piston which is displaced in an axial direction in the cylinder.

2. The damper according to claim 1, wherein the line-shaped member is densely wound around the outer peripheral surface of the movable body.

3. The damper according to claim 2, wherein the line-shaped member is wound around the outer peripheral surface of the movable body, being inclined by 30 degrees or more with respect to a direction of the relative motion.

4. The damper according to claim 2, wherein the line-shaped member has a nap-raised surface or a surface on which short fibers are planted.

5. The damper according to claim 1, wherein the viscous damping element is a viscous fluid adhering to the line-shaped member.

6. The damper according to claim 5, wherein the viscous fluid is grease.

7. The damper according to claim 1, wherein, when the amplitude and the speed during the relative motion of the casing and the movable body are in predetermined ranges or less, the total damping force is substantially equal to or lower than damping force of a friction damper having the same structure except that the friction damper does not include the viscous damping element.

8. The damper according to claim 1, wherein the casing and the movable body are constituted using a permanent magnet and a conductor, and a magnetic field formed by the permanent magnet and the conductor constitutes the viscous damping element.

9. The damper according to claim 1, wherein the cylinder and the piston are disposed in a substantially horizontal posture between two members which are displaced relative to each other.

\* \* \* \* \*